US010171941B2

(12) United States Patent
Masano et al.

(10) Patent No.: US 10,171,941 B2
(45) Date of Patent: Jan. 1, 2019

(54) INFORMATION PROCESSING APPARATUS, INFORMATION PROCESSING METHOD, PROGRAM AND INFORMATION PROCESSING SYSTEM

(71) Applicant: SONY CORPORATION, Tokyo (JP)

(72) Inventors: Toru Masano, Tokyo (JP); Seiji Tatematsu, Kanagawa (JP); Naoshi Kobuya, Chiba (JP); Hiroaki Akiyama, Tokyo (JP); Tadashi Yokoyama, Kanagawa (JP); Tomohiro Naito, Tokyo (JP); Kaoru Nakamura, Kanagawa (JP); Takuya Takahashi, Saitama (JP); Yuichi Ueda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 230 days.

(21) Appl. No.: 14/291,261

(22) Filed: May 30, 2014

(65) Prior Publication Data

US 2015/0012582 A1 Jan. 8, 2015

(30) Foreign Application Priority Data

Jul. 5, 2013 (JP) ................................. 2013-141763

(51) Int. Cl.
*H04W 4/02* (2018.01)
(52) U.S. Cl.
CPC .................................. *H04W 4/023* (2013.01)
(58) Field of Classification Search
CPC .......... H04W 4/023; H04W 4/02; H04L 67/22
See application file for complete search history.

(56) References Cited

U.S. PATENT DOCUMENTS

| | | | | |
|---|---|---|---|---|
| 8,239,130 B1 * | 8/2012 | Upstill | ............... | G01C 21/3679 701/400 |
| 8,996,035 B2 * | 3/2015 | Busch | ................... | H04W 4/029 455/456.3 |
| 9,194,716 B1 * | 11/2015 | Cutter | ................ | G01C 21/3679 |
| 2003/0065805 A1 * | 4/2003 | Barnes, Jr. | ............. | G06Q 10/02 709/231 |
| 2003/0220835 A1 * | 11/2003 | Barnes, Jr. | ......... | G06Q 10/1053 705/14.36 |
| 2005/0255861 A1 * | 11/2005 | Wilson | .................... | H04W 4/02 455/456.2 |
| 2006/0114920 A1 * | 6/2006 | Jung | ....................... | H04L 67/36 370/410 |

(Continued)

FOREIGN PATENT DOCUMENTS

JP 2006-023793 1/2006

*Primary Examiner* — Uzma Alam
(74) *Attorney, Agent, or Firm* — Paratus Law Group, PLLC

(57) ABSTRACT

There is provided an information processing apparatus including an existing place information acquisition part and a my-spot information registration part. The existing place information acquisition part is configured to acquire existing place information which specifies an existing place. The my-spot information registration part is configured to acquire spot information related to a spot, which spot information is provided from a plurality of information provider devices, based on the existing place information; and to register spot information specified by a user as my-spot information, out of the acquired spot information.

11 Claims, 17 Drawing Sheets

(56) References Cited

U.S. PATENT DOCUMENTS

| | | | | |
|---|---|---|---|---|
| 2007/0219706 | A1* | 9/2007 | Sheynblat | G01C 21/3679 701/532 |
| 2007/0281690 | A1* | 12/2007 | Altman | H04W 4/185 455/435.1 |
| 2007/0282621 | A1* | 12/2007 | Altman | G06Q 10/10 705/319 |
| 2008/0014964 | A1* | 1/2008 | Sudit | H04W 4/029 455/456.1 |
| 2008/0132252 | A1* | 6/2008 | Altman | G06Q 30/0207 455/457 |
| 2008/0158018 | A1* | 7/2008 | Lau | G01C 21/20 340/995.24 |
| 2008/0305795 | A1* | 12/2008 | Murakami | H04L 12/1859 455/435.1 |
| 2010/0331016 | A1* | 12/2010 | Dutton | H04W 4/02 455/456.3 |
| 2011/0022299 | A1* | 1/2011 | Feng | G01C 21/20 701/533 |
| 2011/0022305 | A1* | 1/2011 | Okamoto | G01C 21/36 701/533 |
| 2011/0313657 | A1* | 12/2011 | Myllymaki | G01C 21/3682 701/438 |
| 2013/0303192 | A1* | 11/2013 | Louboutin | G06Q 30/0261 455/456.3 |
| 2014/0334264 | A1* | 11/2014 | Thaker | H04W 4/04 367/118 |

* cited by examiner

INFORMATION PROCESSING APPARATUS, INFORMATION PROCESSING METHOD, PROGRAM AND INFORMATION PROCESSING SYSTEM

CROSS REFERENCE TO RELATED APPLICATIONS

This application claims the benefit of Japanese Priority Patent Application JP 2013-141763 filed Jul. 5, 2013, the entire content of which is incorporated herein by reference.

BACKGROUND

The present disclosure relates to an information processing apparatus, an information processing method, a program and an information processing system. More specifically, the present disclosure relates to an information processing apparatus, an information processing method, a program and an information processing system which are capable of enhancing convenience.

From the past, for example, there have been some information processors that provide some information such as a landmark name and landmark location which is associated with a given area, at a given timing, depending on a user's behavior pattern such as the user's staying state and moving state based on historical data of location information of the user. There have been some information processors that register beforehand information of a shop or a place where the user would like to go, or information of the user's favorite shop or place where the user have been to in the past; and remind the user by suggesting that information in response to the location information of the user.

For example, the present applicant has disclosed an information processing apparatus that gives a user a notification of bookmark information in tune with the user's preference, in response to the user's current location and time (see, for example, Japanese Patent Application Laid-Open No. 2006-23793).

SUMMARY

It has been desired to improve convenience by an information processing apparatus than that by the above, by providing a user with information from various sources in a suitable way.

In view of the above-mentioned circumstances, it is desirable to allow enhancement of the convenience.

According to an embodiment of the present disclosure, there is provided an information processing apparatus including an existing place information acquisition part and a my-spot information registration part. The existing place information acquisition part is configured to acquire existing place information which specifies an existing place. The my-spot information registration part is configured to acquire spot information related to a spot, which spot information is provided from a plurality of information provider devices, based on the existing place information; and to register spot information specified by a user as my-spot information, out of the acquired spot information.

According to another embodiment of the present disclosure, there is provided an information processing method, or program, including acquiring existing place information which specifies an existing place. The method or program further includes acquiring spot information related to a spot, which spot information is provided from a plurality of information provider devices, based on the existing place information, and registering spot information specified by a user as my-spot information, out of the acquired spot information.

According to still another embodiment of the present disclosure, there is provided an information processing system including an existing place information acquisition part, a spot information providing processing part and a my-spot information registration part. The existing place information acquisition part is configured to acquire existing place information which specifies an existing place. The spot information providing processing part is configured to search for spot information related to a spot provided from a plurality of information provider devices, based on the existing place information; and to provide a result of the search. The my-spot information registration part is configured to register spot information specified by a user as my-spot information, out of the spot information provided by the spot information providing processing part.

With an embodiment of the present disclosure, existing place information which specifies an existing place would be acquired. Spot information related to a spot would be acquired, which spot information is provided from a plurality of information provider devices, based on the existing place information. Spot information specified by a user, out of the acquired spot information, would be registered as my-spot information.

Thus, an embodiment of the present disclosure may make it possible to allow enhancement of the convenience.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, specific embodiments of the present disclosure will be described in detail with reference to the drawings.

Figure 1:
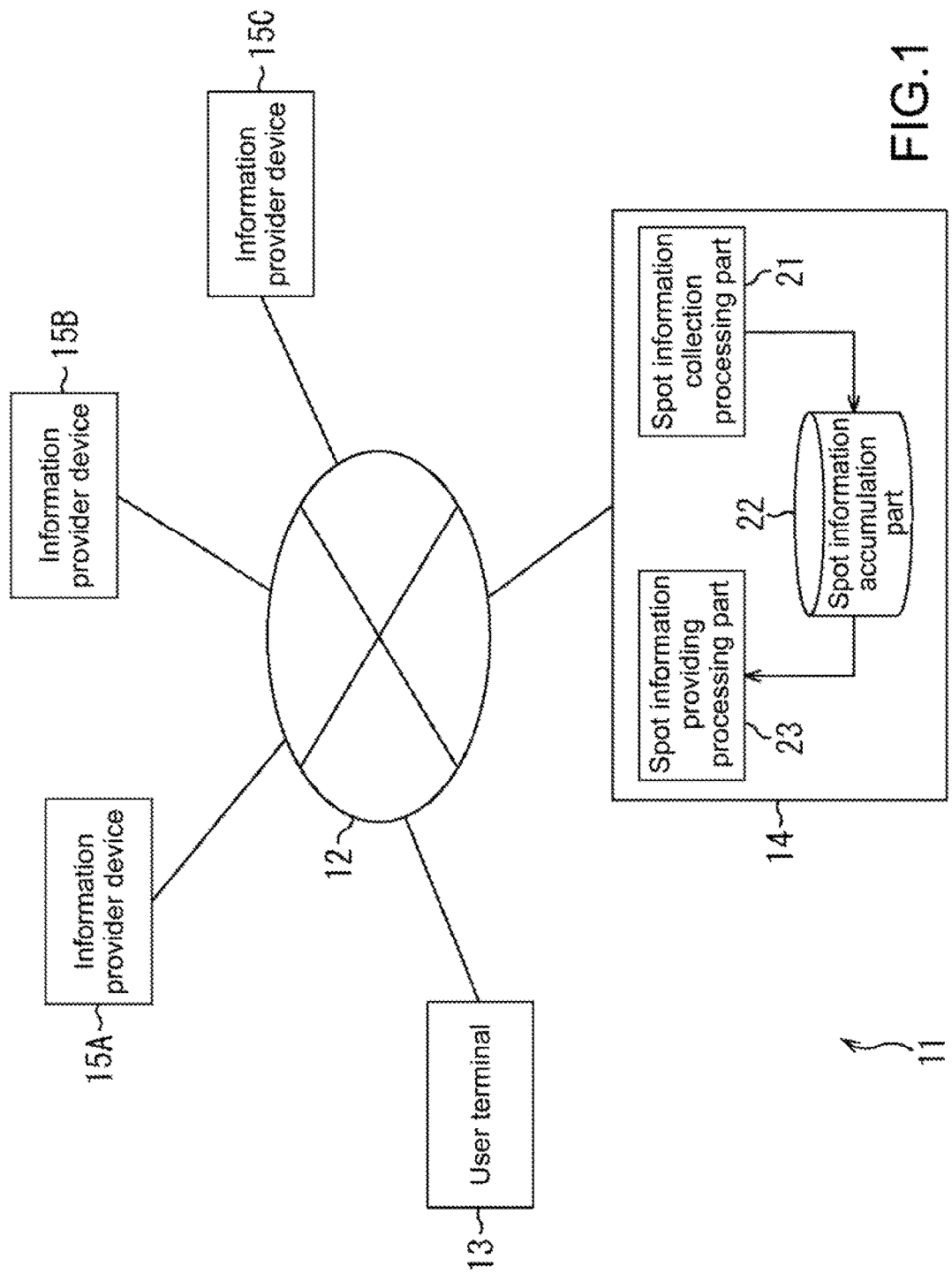
FIG. 1 is a block diagram showing a configuration example of an embodiment of an information processing system according to the present disclosure.

FIG. 1 is a block diagram showing a configuration example of an embodiment of an information processing system according to the present disclosure.

In FIG. 1, an information processing system 11 may be configured by, for example, connecting a user terminal 13 and a spot information accumulation server 14 via a network 12 that includes the Internet or the like. Further, to the network 12, a plurality of information provider devices 15 which provides spot information related to various spots such as restaurants and tourist facilities to the spot information accumulation server 14 is connected. In an example shown in FIG. 1, three information provider devices 15A to 15C are connected to the network 12.

For example, the spot information to be provided to the spot information accumulation server 14 from the information provider devices 15A to 15C includes at least one of textual information that specifies a spot (e.g. phone number and name of a spot) and location information (latitude and longitude). The spot information further includes official information sent out from the spot, comments posted by users who have used the spot, and the like.

The user terminal 13 may be a multi-function information processing terminal referred to as a so-called "smartphone" which has, for example, a telephone function to perform a process related to voice phone and a browser function to perform a process related to web page display. Further, the user terminal 13 has an external service linking function to perform a process in coordination with an external service such as a SNS (Social Networking Service) for promoting users' communication. A configuration of the user terminal 13 will be described later with reference to FIG. 2.

In addition, the user terminal 13 transmits existing place information related to a given place to the spot information accumulation server 14 via the network 12. The spot information corresponding to the existing place information would be provided to the user terminal 13 from the spot information accumulation server 14. The existing place information here can be information related to the place which is recorded in the user terminal 13 based on the user's use of the user terminal 13. For example, the existing place information includes a phone number of a phone call that a user has made with the use of the user terminal 13; a name of the spot and a phone number described in a web page that the user has allowed the user terminal 13 to display; location information posted together with a comment or a photograph to the SNS (posted by the user, and also those posted by other users who have been added to friends by the user); and the like. In other words, the places to be specified by the existing place information are the places that have been indirectly recognized by the user through the user terminal 13; and are different from the places that have been recognized by the user through direct visits by the user.

The spot information accumulation server 14 acquires and accumulates the spot information provided from the information provider devices 15A to 15C at a given timing, periodically. Then the spot information accumulation server 14 transmits, to the user terminal 13, the spot information corresponding to the existing place information transmitted from the user terminal 13. In the example shown in FIG. 1, the spot information accumulation server 14 may be provided with a spot information collection processing part 21, a spot information accumulation part 22, and a spot information providing processing part 23.

The spot information collection processing part 21 collects the spot information provided from the information provider devices 15A to 15C, at each timing preset for the corresponding ones of the information provider devices 15A to 15C (e.g. per one day, or per one week), and accumulates the collected spot information to the spot information accumulation part 22. Specifically, the spot information collection processing part 21 may obtain the spot information by utilizing an API (Application Programming Interface) provided by the information provider devices 15A to 15C. Further, the spot information collection processing part 21 may specify a given folder for storing the spot information, and may obtain the spot information that the information provider devices 15A to 15C have put into the folder.

The spot information accumulation part 22 accumulates the spot information that the spot information collection processing part 21 has collected.

The information providing processing part 23 acquires the existing place information transmitted by the user terminal 13, via the network 12. The information providing processing part 23 then searches the spot information accumulated in the spot information accumulation part 22, on the basis of textual information or location information included in the existing place information. Then the spot information that has been transmitted from the user terminal 13, as a result of the search, which spot information corresponds to the existing place information, would be transmitted by the information providing processing part 23 to the user terminal 13 via the network 12.

The information provider devices 15A to 15C may be, for example, server devices managed by service provider companies, or the like, which run a service providing various spot information by operating gourmet sites providing information related to restaurants, travel sites providing information related to tourist facilities, and the like. For example, in cases where the service provider companies that manage the information provider devices 15A to 15C are operating gourmet sites, if the different services are used by different users, different comments may be made by them on the same restaurant. Hence, even on the same spot, contents of the spot information provided by the information provider devices 15A to 15C may be different.

With the information processing system 11 configured in this way, it is possible to integrate the spot information having the different contents obtained from the information provider devices 15A to 15C, with respect to the same spot, and provide the integrated information to the user terminal 13. Therefore, for example, the comments to be included in the spot information provided to the user terminal 13 by the information processing system 11 may include a comment of a user who uses a service provided by the company that manages the spot information accumulation server 14, and also comments of users who use services provided by other companies that manage the information provider devices 15A to 15C.

Of course, the user can use the browser function of the user terminal and directly access the sites operated by the companies of the information provider devices 15A to 15C, to browse the spot information. However, in that way, the user should separately access each site to obtain more information about a certain spot.

In contrast, with the information processing system 11, the spot information obtained from the information provider devices 15A to 15C can be integrated to be provided to the user terminal 13. Thus, it may save time and effort of the user and enhance the convenience.

Figure 2:
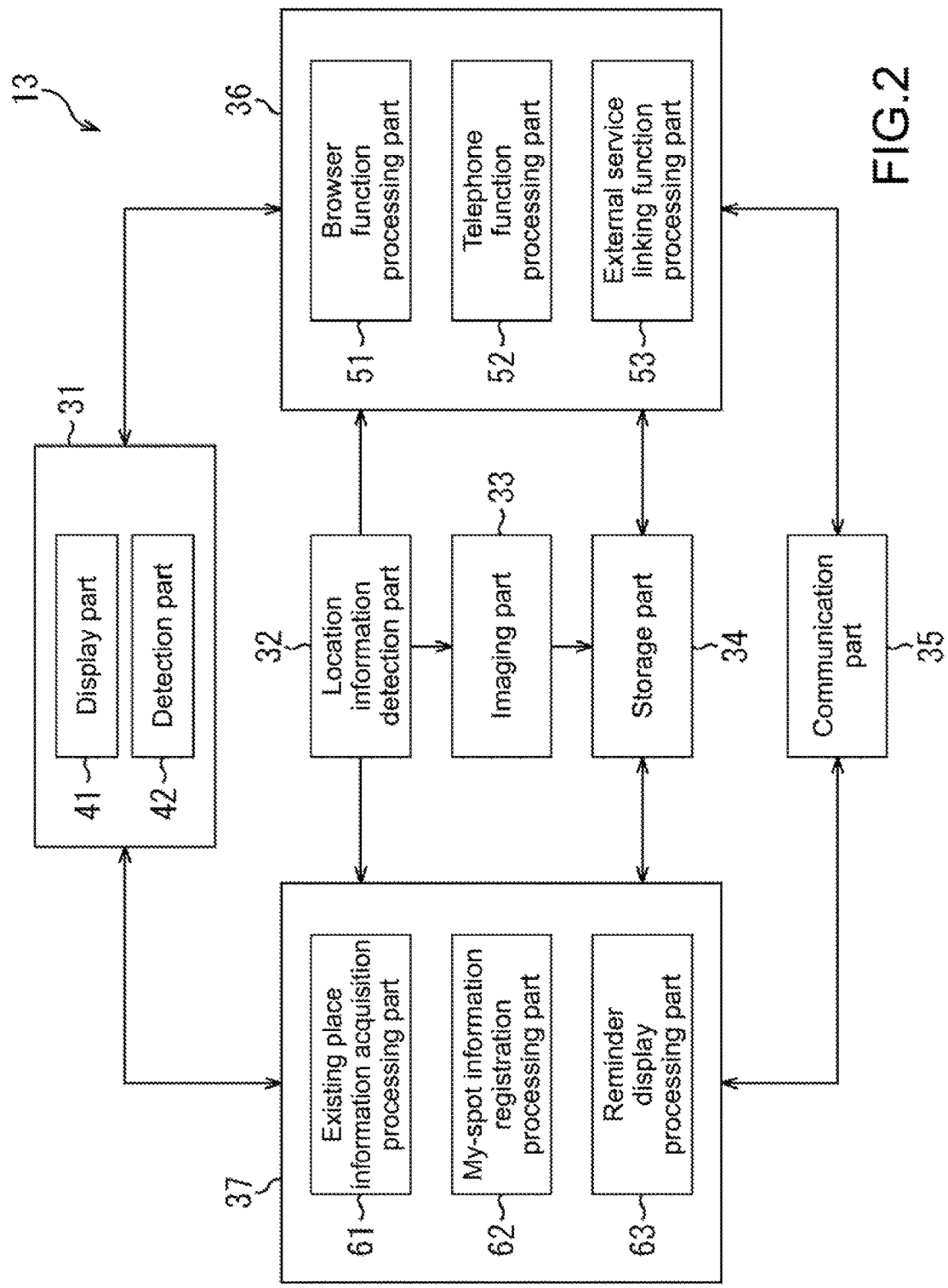
FIG. 2 is a block diagram showing a configuration example of a user terminal.

Next, FIG. 2 is a block diagram showing a configuration example of the user terminal 13.

As shown in FIG. 2, the user terminal 13 may be provided with a touch panel 31, a location information detection part 32, an imaging part 33, a storage part 34, a communication part 35, a function executing part 36 and a spot information processing part 37.

The touch panel 31 has a display part 41 made of a LCD (Liquid Crystal Display) panel, an organic EL (Electro Luminescence) panel or the like; and a detection part 42 for detecting a touch (or an approach) of the finger of the user by using a resistive film method, a capacitance method, or the like.

For example, the touch panel 31 may display a screen, on which a GUI (Graphical User Interface) such as buttons to receive touch inputs by the user is arranged. When the user touches the surface of the touch panel 31 by the finger or the like, the touched point would be detected by the detection part 42. Following this, the touch panel 31 provides an operation signal indicating that an operation was performed on the GUI displayed on the point where the touch was detected, to the function executing part 36 or to the spot information processing part 37.

The location information detection part 32 detects a current location of the user terminal 13 by, for example, using radio waves of GPS (Global Positioning System), wireless LAN (LocalArea Network) or the like; and outputs current location information (latitude and longitude) indicating the current location of the user terminal 13. In addition, the current location information may also include information indicating, for example, a height of the location, the floor number of a building, and the like.

The imaging part 33 has an imaging element such as CCD (Charge Coupled Device) and CMOS (Complementary Metal Oxide Semiconductor) sensor. The imaging part 33 images a subject in response to the user's operation. Then, the imaging part 33 adds to an image data acquired by imaging the subject the current location information output from the location information detection part 32; and allows the storage part 34 to store such data.

The storage part 34 may be made up of a data-rewritable flash memory (e.g. EEPROM (Electronically Erasable and Programmable Read Only Memory)) or the like. The storage part 34 stores the image data provided from the imaging part 33 and various information which may need to be used by the function executing part 36 and the spot information processing part 37 for performing their processes.

The communication part 35 performs communication via the network 12, according to a predetermined communication standard. For example, the communication part 35 may perform communication with the spot information accumulation server 14, to transmit the existing place information as mentioned above to the spot information accumulation server 14 and to receive the spot information transmitted from the spot information accumulation server 14.

The function executing part 36 may execute various functions that the user terminal 13 is provided with; and allow the storage part 34 to store information acquired by executing such functions. In an example shown in FIG. 2, the function executing part 36 may be provided with a browser function processing part 51, a telephone function processing part 52, and an external service linking function processing part 53.

The browser function processing part 51 performs a process of displaying a web page on the touch panel 31 in response to the user's operation. Further, the browser function processing part 51 manages a browsing history list and a bookmark list which are stored in the storage part 34. In the browsing history list, a URL (Uniform Resource Locator) of a web page browsed by the user terminal 13 would be recorded. In the bookmark list, a URL of an arbitrary web page may be registered so as to facilitate access to that web page.

For example, at the time when the browser function processing part 51 displays a web page on the touch panel 31, the browser function processing part 51 acquires the URL of the web page which is the information to specify the location of the web page in the Internet. Then, the browser function processing part 51 may record all the acquired URLs to the browsing history list, and may register the URL of the web page bookmarked by the user's operation, to the bookmark list.

The telephone function processing part 52 performs a process related to voice phone by the user terminal 13, in response to the user's operation. Further, the telephone function processing part 52 manages a phonebook list, a dialed call history list and a received call history list which are stored in the storage part 34. For example, the telephone function processing part 52 may register a phone number allowed to be registered by the user's operation, to the phonebook list; may register all the phone numbers dialed by the user terminal 13, to the dialed call history list; and may register all the phone numbers received by the user terminal 13, to the received call history list.

The external service linking function processing part 53 performs a process in coordination with an external service such as a SNS. In the SNS, there may be provided a function called "check in" which, for example, enables the SNS user to post a comment, a photograph, and the like, related to a spot such as restaurants and tourist facilities, together with the location information of the current location when the user is visiting the spot. When the user makes a check in, a server that provides the SNS acquires, together with a comment or a photograph, for example, information to specify the user who checked in and a date of the check in; and information related to a place that can be specified by the location information (e.g., name of the spot, name of a nearby station, etc.), as check-in information.

When the server that provides the SNS acquires check-in information made by other users specified by the user terminal 13, the external service linking function processing part 53 would acquire the check-in information and register it to a check-in information list which is stored in the storage part 34.

The spot information processing part 37 performs a process related to spot information acquired based on information that has been registered in various lists (the browsing history list, the bookmark list, the phonebook list, the dialed call history list and the received call history list) stored in the storage part 34. In the example shown in FIG. 2, the spot information processing part 37 may be provided with an existing place information acquisition processing part 61, a my-spot information registration processing part 62, and a reminder display processing part 63.

The existing place information acquisition processing part 61 performs a process of acquiring the existing place information related to a given place, on the basis of the information that has been registered in the various lists that have been stored in the storage part 34, periodically at a given timing or according to a selection (instruction) made by the user. Incidentally, a process by which the existing place information acquisition processing part 61 acquires the existing place information will be described later with reference to FIGS. 3 to 5. Then, the existing place information acquisition processing part 61 transmits the acquired existing place information to the spot information accumulation server 14 of FIG. 1 via the communication part 35, and requests provision of the spot information which is related to the spot specified by the existing place information. In principle, the existing place information transmitted to the spot information accumulation server 14 here would be used only for a process of searching for the spot information in the spot information accumulation server 14, and may be used without being saved in the spot information accumulation server 14. However, it is also possible to allow the existing place information transmitted to the spot information accumulation server 14 to be saved in the spot information accumulation server 14.

The my-spot information registration processing part 62 acquires the spot information transmitted from the spot information accumulation server 14 in response to the request from the existing place information acquisition processing part 61, via the communication part 35. Then, the my-spot information registration processing part 62 displays on the touch panel 31 a list of the acquired spot information as a result of the search based on the existing place information; and performs a process of registering spot information selected by the user, as my-spot information, out of the acquired spot information. Further, the my-spot information registration processing part 62 sets a status indicating "went" or "want to go" for each piece of my-spot information, in response to the user's operation. Incidentally, a process by which the my-spot information registration processing part 62 registers the my-spot information will be described later with reference to FIGS. 6 to 12.

The reminder display processing part 63 performs a process of displaying a reminder to remind the user of a spot of the my-spot information to which the status indicating "want to go" has been set, when the spot exists within a predetermined range centered at a current location of the user terminal 13. Further, for example, the reminder display processing part 63 may perform the process of displaying the reminder when the current location of the user terminal 13 is in a predetermined building and the building contains a spot of the my-spot information to which the status indicating "want to go" has been set. Incidentally, a process by which reminder display processing part 63 displays the reminder will be described later with reference to FIGS. 13 and 14.

Figure 3:
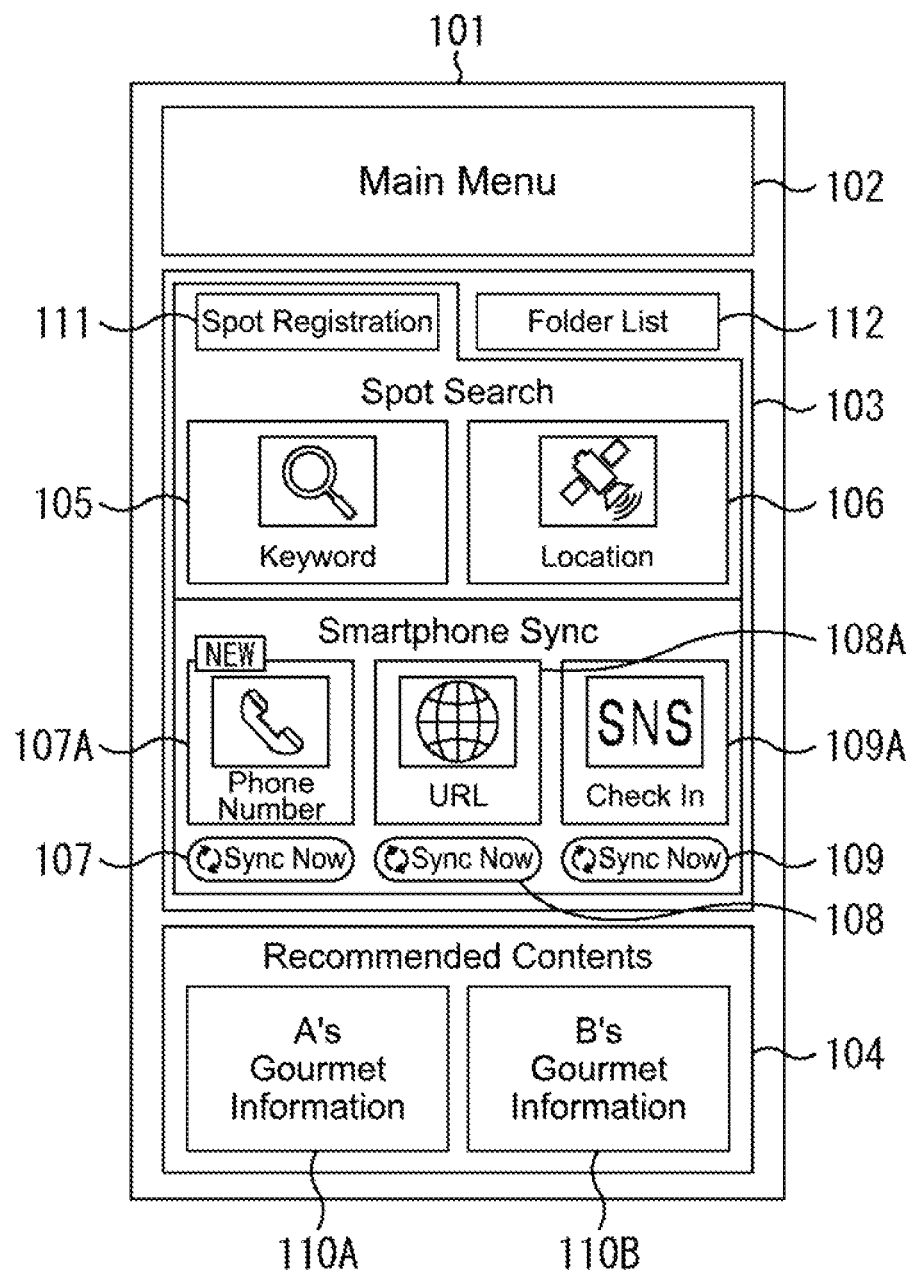
FIG. 3 is a figure showing a main menu screen.

Next, FIG. 3 is a figure showing a main menu screen which is displayed on the touch panel 31 at the time when the spot information processing part 37 starts the execution of the process.

As shown in FIG. 3, in a main menu screen 101, a screen name display area 102, a menu display area 103, and a recommended contents display area 104 are displayed.

In the screen name display area 102, a screen name is displayed, which screen name indicates that the main menu screen 101 which displays a main menu to perform the processes related to spot information is displayed. In an example shown in FIG. 3, a screen name of "Main Menu" is displayed in the screen name display area 102.

In the menu display area 103, some buttons (GUI) for selecting a way of searching for a spot are displayed. In the example shown in FIG. 3, a keyword button 105 and a location button 106 are displayed as a spot search menu in the menu display area 103. Further, a phone number synchronization start button 107, a phone number synchronization result display button 107A, a URL synchronization start button 108, a URL synchronization result display button 108A, a SNS synchronization start button 109 and a SNS synchronization result display button 109A are displayed as a smartphone synchronization menu in the menu display area 103.

In addition, the display of the menu display area 103 is switchable between a spot registration display that shows the buttons as shown in FIG. 3 for selecting a way of searching for a spot and a folder list display that shows a list of registration folders in which my-spot information has been registered. That is, a spot registration tab 111 and a folder list tab 112 shown in the upper part of the menu display area 103 may be mutually exclusively selected, and in the display example of FIG. 3, a state in which the spot registration tab 111 is selected (spot registration display) is shown. Incidentally, a state in which the folder list tab 112 is selected (folder list display) will be described later with reference to FIG. 8.

The keyword button 105 may be operated when a mode of searching for a spot by using a keyword that the user inputs is selected. The location button 106 may be operated when a mode of searching for a spot by using a current location of the user terminal 13 is selected.

Besides, the phone number synchronization start button 107 may be operated to select a mode of starting a phone number synchronization process which allows a synchronization of associations between the existing place information acquired from the phone numbers that have been registered in the phonebook list, the dialed call history list and the received call history list which lists are stored in the storage part 34; and the spot information that has been accumulated in the spot information accumulation server 14. The phone number synchronization result display button 107A may be operated to display a result of the latest phone number synchronization process. When the phone number synchronization result display button 107A is touched, for example, a my-spot information registration screen shown in FIG. 6, which will be described later, may be displayed.

The URL synchronization start button 108 may be operated to start a URL synchronization process which allows a synchronization of associations between the existing place information acquired from the URLs that have been registered in the browsing history list and the bookmark list which lists are stored in the storage part 34; and the spot information that has been accumulated in the spot information accumulation server 14. The URL synchronization result display button 108A may be operated to display a result of the latest URL synchronization process. When the URL synchronization result display button 108A is touched, for example, a my-spot information registration screen shown in FIG. 6, which will be described later, may be displayed.

The SNS synchronization start button 109 may be operated to select a mode of starting a SNS synchronization process which allows a synchronization of associations between the existing place information acquired from the check-in information that have been registered in the check-in information list stored in the storage part 34; and the spot information that has been accumulated in the spot information accumulation server 14. The SNS synchronization result display button 109A may be operated to display a result of the latest SNS synchronization process. When the SNS synchronization result display button 109A is touched, for example, a check-in information selection screen shown in FIG. 5, which will be described later, may be displayed.

Further, for example, when the phone number synchronization process is performed in the user terminal 13 and a result of synchronization which is not yet acknowledged by the user exists, as shown in FIG. 3, a mark of "NEW" to notify the user of a presence of the new result of synchronization may be displayed over the phone number synchronization result display button 107A. Incidentally, although not shown, the same can be applied to the URL synchronization result display button 108A and the SNS synchronization result display button 109A. In addition, for example, when the SNS synchronization process is not performed in the user terminal 13 and there is no result of synchronization obtained, the SNS synchronization result display button 109A may be displayed in a grayout state and be unable to be selected. The same can be applied to the phone number synchronization result display button 107A and the URL synchronization result display button 108A.

In the recommended contents display area 104, some buttons which may be operated to display some contents recommended by the service provider companies providing the spot information are displayed. In the example shown in FIG. 3, a gourmet information button 110A and a gourmet information button 110B are displayed in the recommended contents display area 104. For example, the gourmet information button 110A may be operated to display a content recommended by the service provider company that manages the information provider device 15A. Besides, for example, the gourmet information button 110B may be operated to display a content recommended by the service provider company that manages the information provider device 15B.

Now, when the user touches the phone number synchronization start button 107, the existing place information acquisition processing part 61 reads out all the phone numbers from the phonebook list, the dialed call history list and the received call history list, which lists are stored in the storage part 34, and acquires the phone numbers as the existing place information. Incidentally, for example, in a way other than reading out all the phone numbers, the existing place information acquisition processing part 61 may be configured to acquire some phone numbers that have been registered in a given period of time (e.g., within recent one week).

In addition, typically, restaurants and tourist facilities are expected to have their fixed-line phones. In view of this, the existing place information acquisition processing part 61 may subject all the read-out phone numbers to a filtering by the phone numbers of cellular phones, and acquire only the phone numbers of fixed-line phones. Moreover, the existing place information acquisition processing part 61 may perform a filtering by international telephone identification numbers, country codes, area codes and the like. Thus, the phone numbers to be acquired can be refined on the basis of the current location. For example, the existing place information acquisition processing part 61 may perform the filtering by one given country (e.g., Japan); and may perform the filtering by a given group of countries (e.g., the United States and Canada, etc.). Furthermore, for example, the existing place information acquisition processing part 61 may perform the filtering by the area (prefecture, state, etc.) which corresponds with the current location.

Further, when the User touches the URL synchronization start button 108, the existing place information acquisition processing part 61 displays a web page selection screen shown in FIG. 4, which will be described later, on the touch panel 31. With the web page selection screen, a web page to be used for acquisition of spot information may be selected by the user, out of web pages of the URLs that have been registered in the browsing history list and the bookmark list. Then, the existing place information acquisition processing part 61 acquires the existing place information from the web page selected by the user.

Still further, when the User touches the SNS synchronization start button 109, the existing place information acquisition processing part 61 displays a check-in information selection screen shown in FIG. 5, which will be described later, on the touch panel 31. With the check-in information selection screen, check-in information to be used for acquisition of spot information may be selected by the user, out of the check-in information that has been registered in the check-in information list. Then, the existing place information acquisition processing part 61 acquires the existing place information from the check-in information selected by the user.

Figure 4:
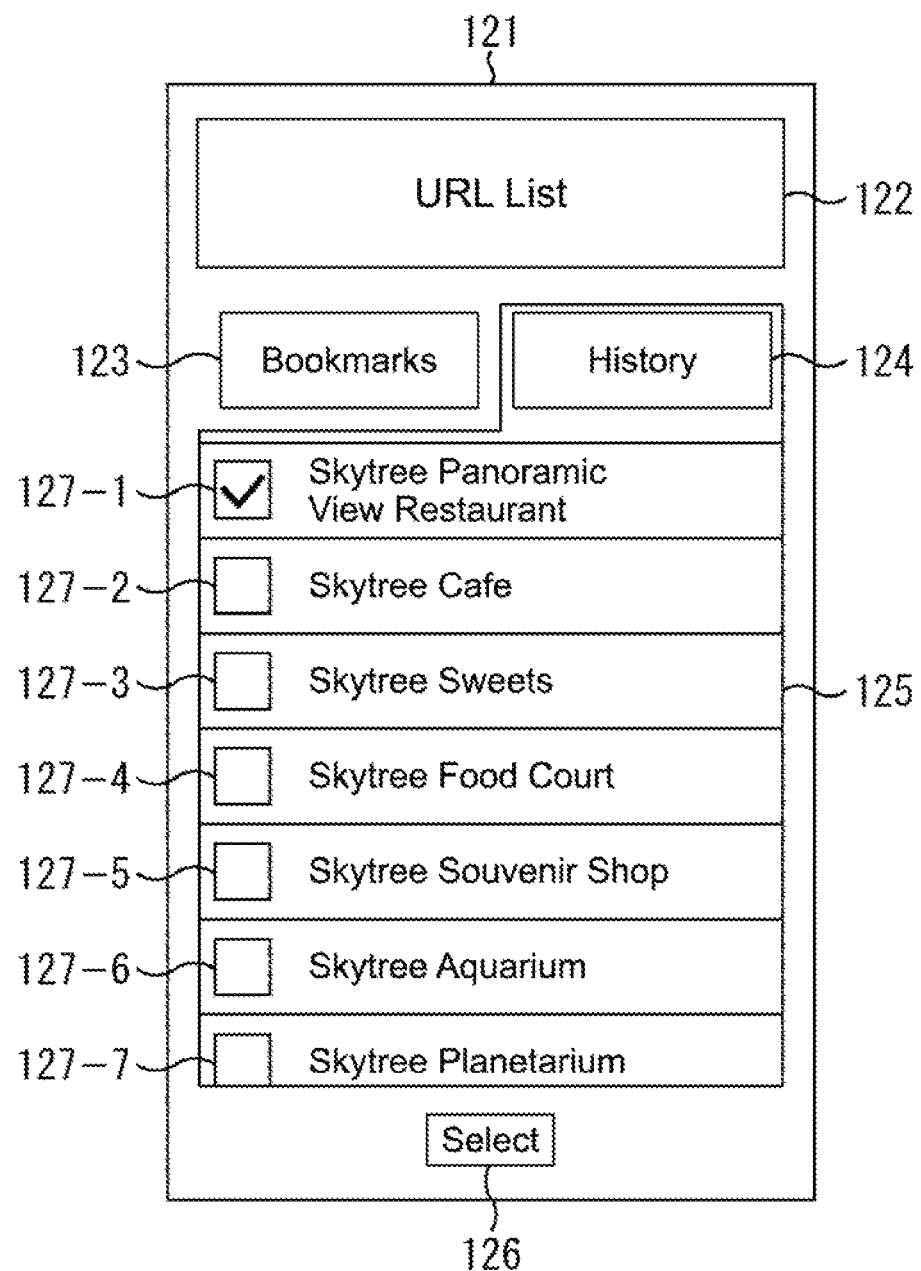
FIG. 4 is a figure showing a web page selection screen.

In FIG. 4, there is shown a web page selection screen that the existing place information acquisition processing part 61 displays on the touch panel 31.

As shown in FIG. 4, in a web page selection screen 121, a screen name display area 122, a bookmarks tab 123, a history tab 124, a list display area 125 and a select button 126 are displayed.

In the screen name display area 122, a screen name is displayed, which screen name indicates that the web page selection screen 121 is displayed. In an example shown in FIG. 4, a screen name of "URL List" is displayed in the screen name display area 122.

The bookmarks tab 123 and the history tab 124 may be mutually exclusively selected, and in the example of FIG. 4, a state in which the history tab 124 is selected is shown. The bookmarks tab 123 may be selected to allow the titles of the web pages that have been registered in the bookmark list to be displayed in the list display area 125. The history tab 124 may be selected to allow the titles of the web pages that have been registered in the browsing history list to be displayed in the list display area 125.

In the list display area 125, a list of the titles of the web pages that have been registered in any of the bookmark list and the browsing history list may be displayed. In the example of FIG. 4, a state in which the history tab 124 is selected is shown, and a list of the titles of the web pages registered in the browsing history list is displayed.

Further, in the list display area 125, a check box 127 is displayed for each title so that the user can select a website with a corresponding title by using the check box 127. For example, in the list display area 125 shown in FIG. 4, some check boxes 127-1 to 127-7 are displayed, and a state in which the check box 127-1 is selected is shown.

The select button 126 may be operated to decide the selection of a website to use in the search for a spot.

For example, the user may use the check boxes 127 of the list display area 125 to select the website to use in the search for a spot, and may decide the selection by operating the select button 126. In response to this, the existing place information acquisition processing part 61 may access the web page selected by the user, and perform character recognition processing to recognize the characters contained in the web page. Then, as a result of the character recognition processing, if the existing place information acquisition processing part 61 recognizes that at least one of the name of the spot and the phone number is contained in the web page selected by the user, the existing place information acquisition processing part 61 may acquire at least one of the recognized name of the spot and the phone number, as the existing place information. Furthermore, the existing place information acquisition processing part 61 may acquire a predetermined identifier (ID) embedded in the web page, which may specifically be tags written in HTML (Hyper Text Markup Language), XML (Extensible Markup Language), or the like, as the existing place information. Incidentally, the process of acquiring the existing place information from the web page selected by the user may be performed, in a way other than being performed by the existing place information acquisition processing part 61, for example, by requesting the spot information accumulation server 14 to perform that process, and allowing the existing place information acquisition processing part 61 to acquire a result of the process made by the spot information accumulation server 14.

Figure 5:
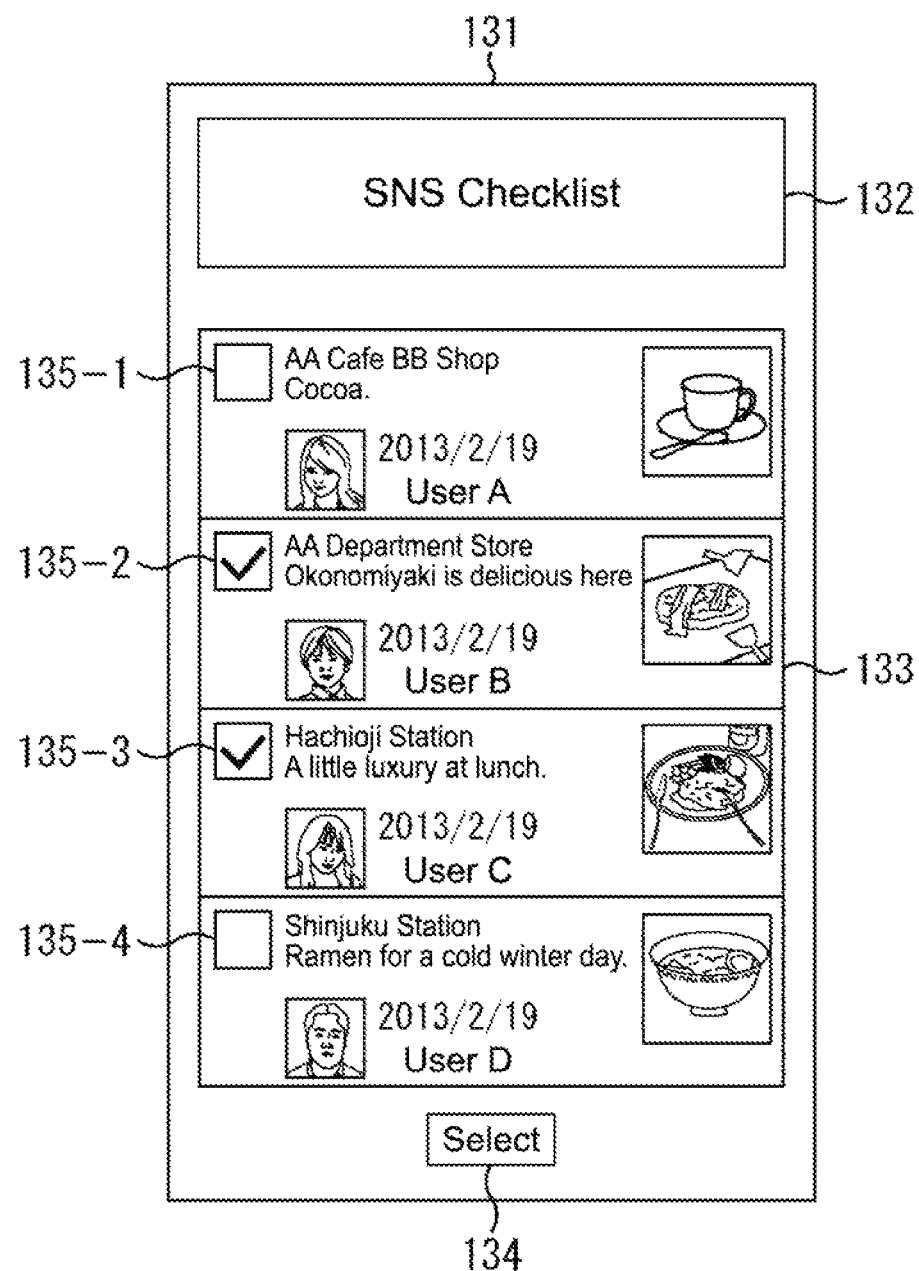
FIG. 5 is a figure showing a check-in information selection screen.

In FIG. 5, there is shown a check-in information selection screen that the existing place information acquisition processing part 61 displays on the touch panel 31. Incidentally, if the user touches the SNS synchronization start button 109 shown in FIG. 3, the check-in information of that time would be acquired and the check-in information selection screen that displays a list of the latest check-in information would be displayed. Further, if the user touches the SNS synchronization result display button 109A shown in FIG. 3, for example, the check-in information selection screen that displays a list of check-in information that has been acquired at a timing of acquiring check-in information through automatic synchronization or the like would be displayed.

As shown in FIG. 5, in a check-in information selection screen 131, a screen name display area 132, a list display area 133 and a select button 134 are displayed.

In the screen name display area 132, a screen name is displayed, which screen name indicates that the check-in information selection screen 131 is displayed. In an example shown in FIG. 5, a screen name of "SNS Checklist" is displayed in the screen name display area 132.

In the list display area 133, a list of the information to be displayed in the check-in information selection screen 131, out of the check-in information that has been registered in the check-in information list, is displayed. The information to be displayed in the check-in information selection screen 131 here may include a profile image of a user who checked in and the user's name, date and place of the check in, as well as comments and images that the user posted at the time of the check in.

Further, in the list display area 133, a check box 135 is displayed for each piece of check-in information so that the user can select the check-in information by using the check box 135. For example, in the list display area 133 shown in FIG. 5, some check boxes 135-1 to 135-4 are displayed, and a state in which the check boxes 135-2 and 135-3 are selected is shown.

The select button 134 may be operated to decide the selection of the check-in information to use in the search for a spot.

For example, the user may use the check boxes 135 of the list display area 133 to select the check-in information to use in the search for a spot, and may decide the selection by operating the select button 134. In response to this, the existing place information acquisition processing part 61 may read out the check-in information selected by the user, from the check-in information list stored in the storage part 34. Thus, the existing place information acquisition processing part 61 may acquire the location information and the name of the spot that are contained in the selected check-in information, as the existing place information. Furthermore, the existing place information acquisition processing part 61 may acquire the existing place information by performing character recognition processing on the comments contained in the check-in information.

As described above, the existing place information acquisition processing part 61 acquires the existing place information (e.g., phone number, name of a spot, or location information) and transmits the acquired existing place information to the spot information accumulation server 14 shown in FIG. 1. When the spot information accumulation server 14, in response to this, transmits the spot information that corresponds to the existing place information, the my-spot information registration processing part 62 would acquire such spot information. Then, the my-spot information registration processing part 62 may display a my-spot information registration screen on the touch panel 31, in order to register the spot information as my-spot information, for the spot information being selected by the user, out of the acquired spot information.

Figure 6:
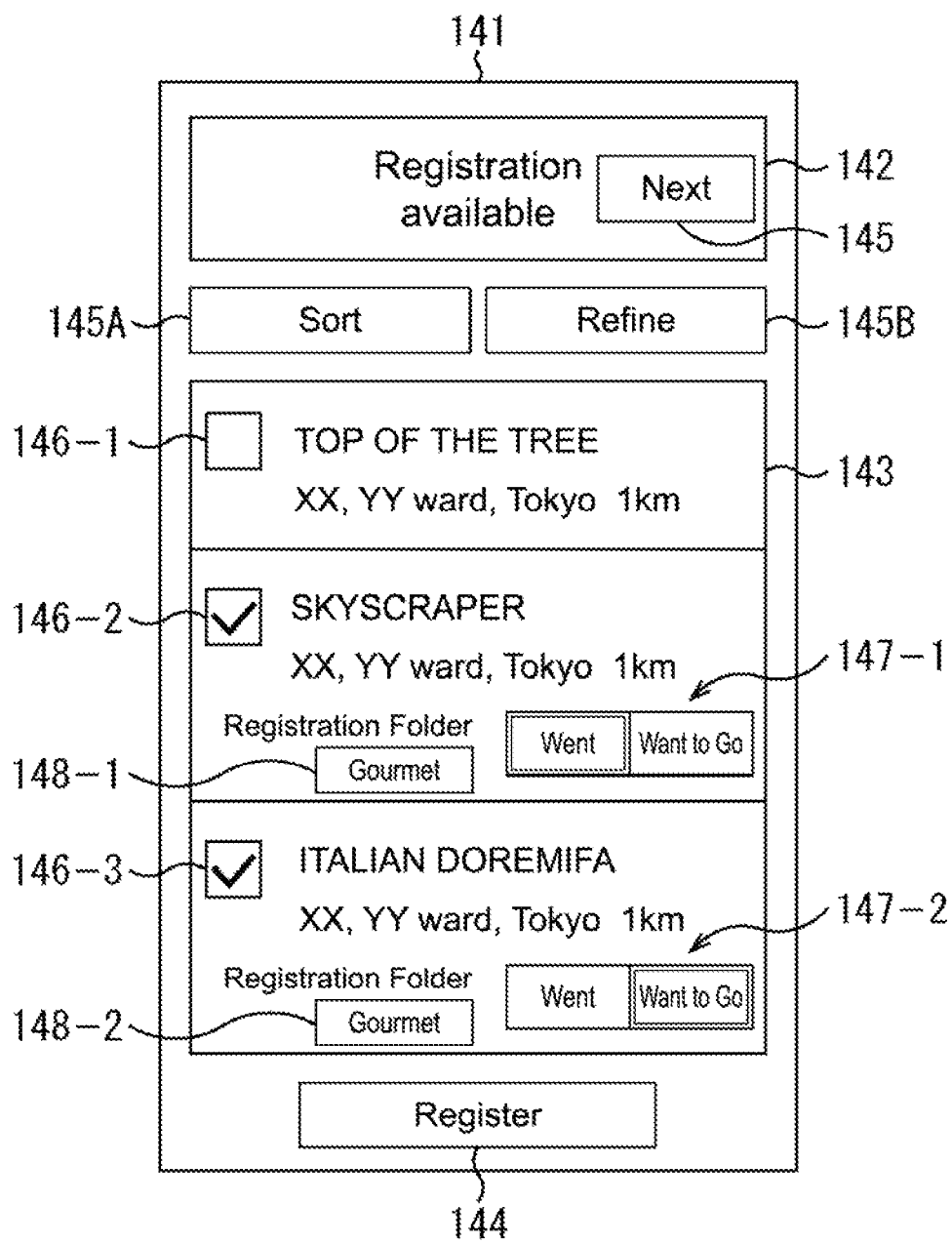
FIG. 6 is a figure showing a my-spot information registration screen.

In FIG. 6, there is shown a my-spot information registration screen that the my-spot information registration processing part 62 displays on the touch panel 31.

As shown in FIG. 6, in a my-spot information registration screen 141, a screen name display area 142, a list display area 143, a register button 144, a sort button 145A and a refine button 145B are displayed. For example, the my-spot information registration processing part 62 may display the my-spot information registration screen 141 at a timing when it acquires the spot information from the spot information accumulation server 14. Alternatively, the my-spot information registration processing part 62 may notify the user via the main menu screen 101 that the spot information from the spot information accumulation server 14 is acquired, and then it may display the my-spot information registration screen 141 at a timing in accordance with the user's operation.

In the screen name display area 142, a screen name is displayed, which screen name indicates that the screen shows the my-spot information registration screen 141, which screen displays the spot information available as the information to register as my-spot information, is displayed. In an example shown in FIG. 6, a screen name of "Registration available" is displayed in the screen name display area 142. Incidentally, a set of the predetermined number of pieces of spot information would be displayed at each time in the list display area 143. In response to this, in the screen name display area 142, there is also displayed a button 145 for showing the next set of the predetermined number of pieces of spot information that follows the currently displayed one.

The sort button 145A may be operated to sort the pieces of spot information displayed in the list display area 143. When the sort button 145A is operated, conditions for sorting would be displayed. Then, the pieces of spot information which are sorted according to the condition selected by the user would be displayed in the list display area 143. The refine button 145B may be operated to refine the spot information displayed in the list display area 143. When the refine button 145B is operated, conditions for refining would be displayed. Then, the spot information which is refined according to the condition selected by the user would be displayed in the list display area 143.

In the list display area 143, a list of the spot information that the my-spot information registration processing part 62 has acquired, that is, an integrated list of the spot information provided from the information provider devices 15A to 15C, is displayed.

Example of the spot information to be displayed in the list display area 143 includes the name of the spot; the address of the spot; and a distance from the current location to the spot. Further, in the list display area 143, a check box 146 is displayed for each piece of spot information so that the user can select the spot information to register as my-spot information, by using the check box 146. For example, in the list display area 143 shown in FIG. 6, some check boxes 146-1 to 146-3 are displayed, and a state in which the check boxes 146-2 and 146-3 are selected is shown. In addition, in the list display area 143, the closest station to the spot; a distance to the spot from the closest station thereto; an estimated travelling time from the current location to the spot; a still image or a moving image related to the spot; a coupon that can be used at the spot, and the like, may also be displayed as the spot information.

Further, in the list display area 143, some dropdown lists 148 and status switching buttons 147 are displayed with the pieces of spot information that have been selected with the use of the check boxes 146.

The dropdown list 148 may be operated to specify a registration folder to register the spot information. When the dropdown list 148 is operated, a list of registration folders would be displayed, and an arbitrary registration folder can be selected from the listed registration folders. In the example of FIG. 6, the dropdown lists 148-1 and 148-2 are displayed, and a state in which the registration folders named "gourmet" are selected in both of the dropdown lists 148-1 and 148-2 is shown. In addition, it is also possible to create a new registration folder, and a name of the registration folder may be decided arbitrarily by the user.

The status switching button 147 may be operated to switch a status with respect to the spot. In the example of FIG. 6, the status switching buttons 147 to switch the statuses of "went" and "want to go" are shown. In the example of FIG. 6, a state in which a status switching button 147-1 is made to select the status of "went" while a status switching button 147-2 is made to select the status of "want to go" is shown.

The register button 144 may be operated to perform registration of the selected spot information as my-spot information.

For example, the user may use the check boxes 146 of the list display area 143 to select the spot information to register as my-spot information, and may allow the selected spot information to be registered as my-spot information by operating the register button 144. In response to this, the my-spot information registration processing part 62 may register the spot information selected by the user, as my-spot information, in the registration folder that has been specified with the use of the corresponding dropdown list 148. Then, in cases where a plurality of pieces of my-spot information is registered in the corresponding registration folder, the my-spot information registration processing part 62 displays a my-spot information list display screen, on the touch panel 31.

Figure 7:
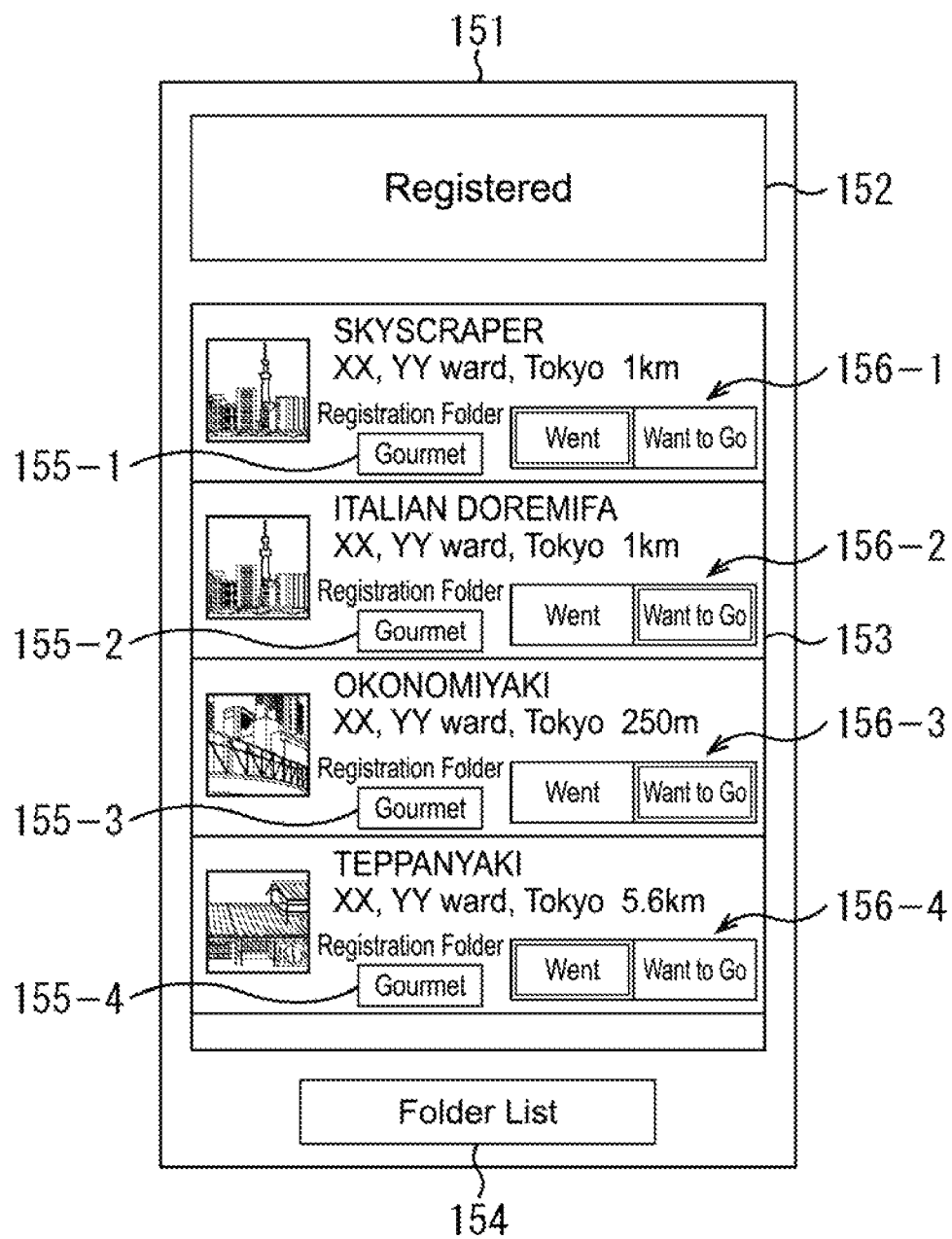
FIG. 7 is a figure showing a my-spot information list display screen.

In FIG. 7, there is shown a my-spot information list display screen that the my-spot information registration processing part 62 displays on the touch panel 31.

As shown in FIG. 7, in a my-spot information list display screen 151, a screen name display area 152, a list display area 153, and a folder list button 154 are displayed.

In the screen name display area 152, a screen name is displayed, which screen name indicates that the screen shows the my-spot information list display screen 151 displayed as a result of registering the my-spot information with the use of the my-spot information registration screen 141. In an example shown in FIG. 7, a screen name of "Registered" is displayed in the screen name display area 152.

In the list display area 153, a list of the pieces of my-spot information that have been registered with the use of the my-spot information registration screen 141 is displayed. Example of the my-spot information to be displayed in the list display area 153 includes an image and the name of the spot; the address of the spot; and a distance from the current location to the spot. Further, some dropdown lists 155-1 to 155-4 each of which may show the registration folder in which the my-spot information has been registered, and some status switching buttons 156-1 to 156-4 each of which may switch the status of "went" and "want to go" with respect to the corresponding spot, are displayed with their corresponding ones of the pieces of my-spot information. In addition, in the list display area 153, the closest station to the spot; a distance to the spot from the closest station thereto; an estimated travelling time from the current location to the spot; a still image or a moving image related to the spot; a coupon that can be used at the spot, and the like, may also be displayed as the spot information.

The folder list button 154 may be operated to display a list of the registration folders in which the my-spot information has been registered. When the user operates the folder list button 154, a main menu screen of a registration folders list display, which shows a list of the registration folders, would be displayed on the touch panel 31. Then, when the user selects a registration folder that the user wants to view from the main menu screen of the registration folders list display, the my-spot information registration processing part 62 would display the my-spot information list display screen that shows the my-spot information registered in the registration folder, on the touch panel 31.

Figure 8:
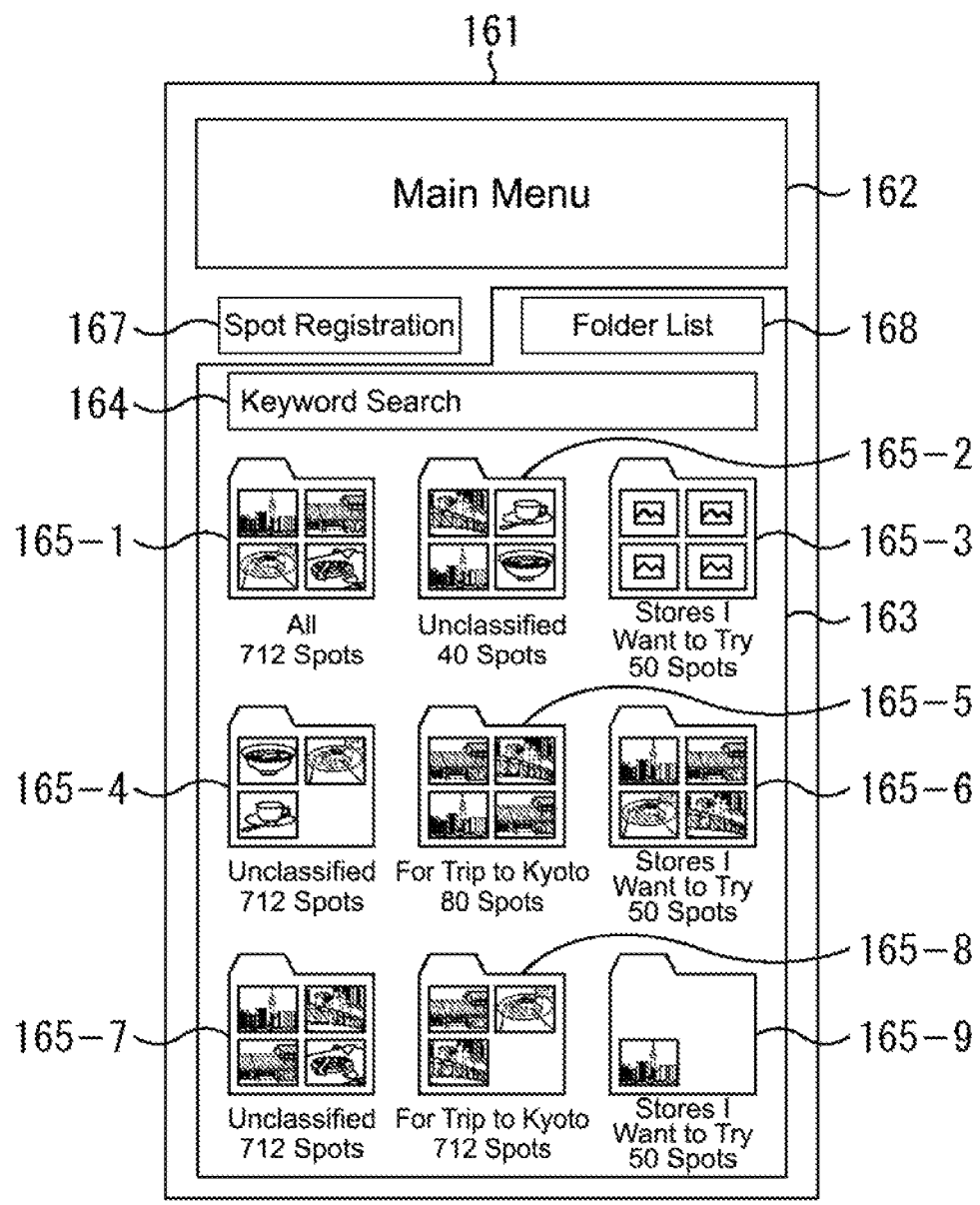
FIG. 8 is a figure showing a registration folder list display in a main menu screen.

In FIG. 8, there is shown a main menu screen provided as a registration folders list display that the my-spot information registration processing part 62 displays on the touch panel 31.

As shown in FIG. 8, in a main menu screen 161 of the registration folders list display, a screen name display area 162 and a folder display area 163 are displayed.

In the screen name display area 162, in the same manner as in the main menu screen 101 of FIG. 3, a screen name of "Main Menu" is displayed.

In the folder display area 163, a keyword search window 164 and a list of all of the icons 165 of the registration folders are displayed. It should be noted that the display of the folder display area 163 is, as mentioned above referring to FIG. 3, switchable between the spot registration display and the folder list display. In the upper part of the folder display area 163, a spot registration tab 167 and a folder list tab 168 for switching the display are displayed. That is, in a display example of FIG. 8, a state in which the folder list tab 168 is selected (folder list display) is shown. If the spot registration tab 167 is selected (spot registration display), the menu display area 103 of FIG. 3 would be displayed.

To the keyword search window 164, a retrieval keyword can be input when a search for a spot that has been registered as my-spot information is to be performed.

In the example of FIG. 8, there are some icons 165-1 to 165-9 of the registration folders displayed in the folder display area 163. By scrolling the folder display area 163, the icons 165 of all of the registration folders are able to be displayed. In addition, below each registration folder's icon 165, a name of the corresponding registration folder and the number of the pieces of my-spot information registered in the corresponding registration folder (e.g., that the name of the registration folder corresponding to the icon 165-5 is "For Trip to Kyoto"; and that eighty pieces of my-spot information are registered in the folder) would be displayed. Furthermore, together with each icon 165 of the registration folder, up to four images included in the my-spot information registered in that registration folder (e.g., image of image display area 184 shown in FIG. 10) may be displayed.

Then, when the user selects the registration folder by touching the corresponding icon 165 displayed in the folder display area 163 in the main menu screen 161 of the registration folders list display, a my-spot information list display screen showing the my-spot information that has been registered in that registration folder would be displayed on the touch panel 31.

Figure 9:
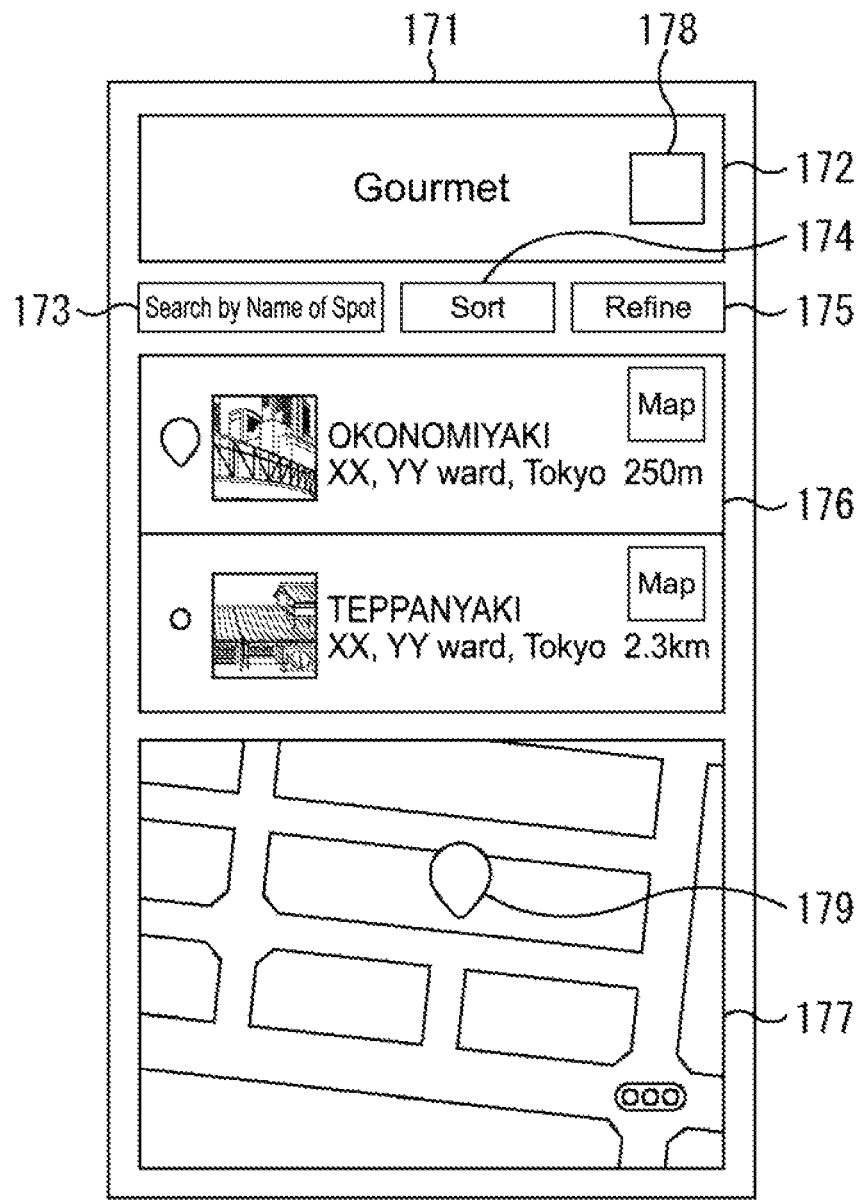
FIG. 9 is a figure showing a my-spot information list display screen which shows the my-spot information registered in a registration folder.

In FIG. 9, there is shown a my-spot information list display screen showing the my-spot information of the corresponding registration folder that the my-spot information registration processing part 62 displays on the touch panel 31.

As shown in FIG. 9, in a my-spot information list display screen 171 showing the my-spot information of the corresponding registration folder, a screen name display area 172, a spot name search window 173, a sort button 174, a refine button 175, a list display area 176 and a map display area 177 are displayed.

In the screen name display area 172, a name of the registration folder, in which the my-spot information displayed in the my-spot information list display screen 171 is registered, is displayed. In an example shown in FIG. 9, a registration folder's name of "Gourmet" is displayed in the screen name display area 172. Further, in the screen name display area 172, a folder operating button 178 to be operated for selecting another registration folder, or for other operations, is displayed.

To the spot name search window 173, a retrieval keyword can be input when a search for a spot that has been registered as my-spot information is to be performed. The sort button 174 may be operated to sort the pieces of spot information displayed in the list display area 176. The refine button 175 may be operated to refine the spot information displayed in the list display area 176.

In the list display area 176, a list of the pieces of my-spot information that have been registered in the selected registration folder is displayed. In addition, the list display area 176 may be displayed in a range which also covers the area in which the map display area 177 in FIG. 9 is displayed; and when a map button displayed with the corresponding one of the pieces of my-spot information in the list display area 176 is operated, the list display area 176 may reduce its range, to allow the map display area 177 to be displayed.

The map display area 177 is configured to display a map of a neighborhood of a spot of interest as an object of map display, in response to operation on the map button in the list display area 176. In addition, in the map display area 177, an icon 179 indicating the location of the spot of interest would be displayed. Further, it is also possible to display an icon for indicating the current location of the user terminal 13, a route up to the spot of interest, and the like, in the map display area 177.

For example, when the user selects the my-spot information among the my-spot information displayed in any of the list display area 153 of FIG. 7 and the list display area 176 of FIG. 9, the my-spot information registration processing part 62 displays a my-spot information detail display screen showing detailed information of the selected my-spot information, on the touch panel 31.

Figure 10:
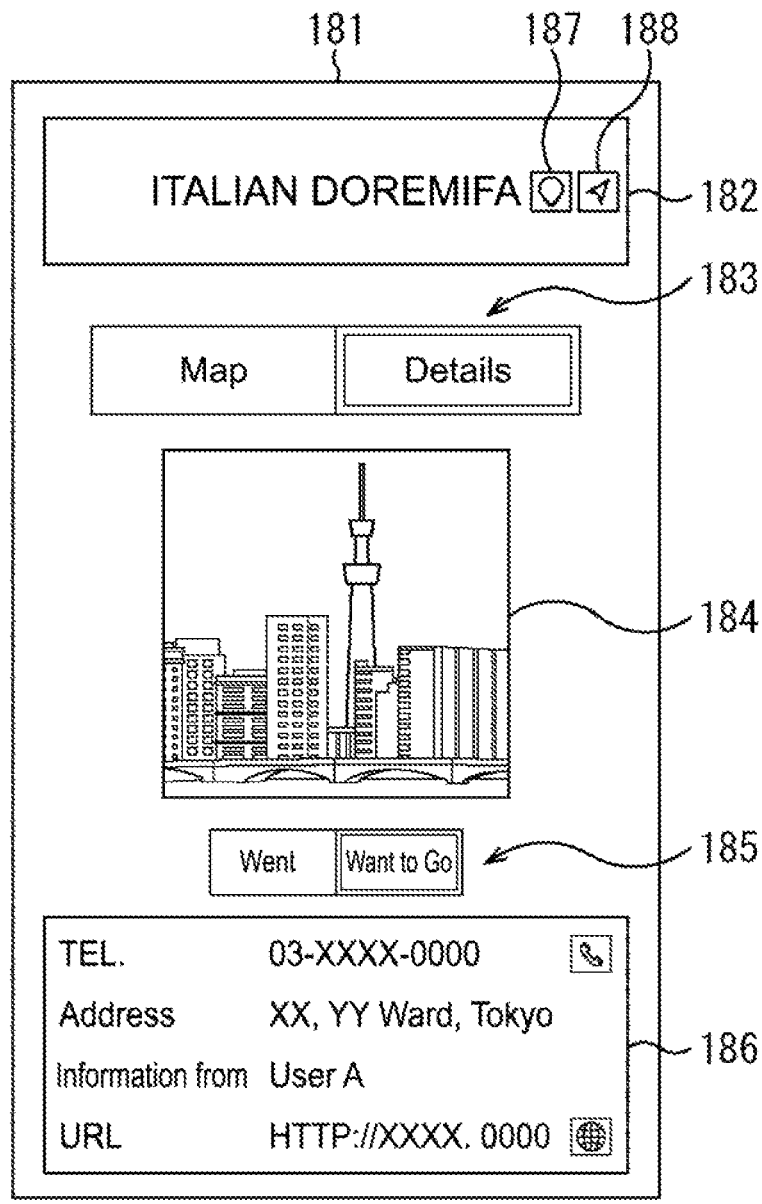
FIG. 10 is a figure showing a my-spot information detail display screen.

In FIG. 10, there is shown a my-spot information detail display screen that the my-spot information registration processing part 62 displays on the touch panel 31.

As shown in FIG. 10, in a my-spot information detail display screen 181, a spot name display area 182, a display switching button 183, an image display area 184, a status switching button 185 and a detailed spot information display area 186 are displayed.

In the spot name display area 182, a name of the spot that is displayed in the my-spot information detail display screen 181 is displayed. In an example shown in FIG. 10, a name of the spot "ITALIAN DOREMIFA" is displayed in the spot name display area 182. Further, in the spot name display area 182, a folder operating button 187 to be operated for operations such as modification and deletion regarding the registration folder in which the spot is registered, is displayed. In addition, in the spot name display area 182, there is also displayed a navigation button 188 which may be operated to perform navigation from the current location to the spot.

The display switching button 183 may be operated to switch the contents to display in the my-spot information detail display screen 181. In the example shown in FIG. 10, the display switching button 183 is operable to switch the contents of "Map" and "Details" as the contents to display. FIG. 10 shows a state in which the "Details" is selected as the contents to display.

In the image display area 184, an image of the spot included in the my-spot information is displayed. Incidentally, in the image display area 184, for example, a single image included in the spot information being acquired from the information provider devices 15A to 15C may be displayed; or, some images included in their spot information may be mixed and displayed together.

The status switching button 185 may be operated to switch a status with respect to the spot, in the same manner as in the status switching buttons 147 of FIG. 6.

In the detailed spot information display area 186, detailed information related to the spot is displayed; and in the example shown in FIG. 10, the phone number and address of the spot, a source of the information and the URL are displayed. The source of the information to be displayed here in the detailed spot information display area 186 is based on the existing place information involved in acquisition of the spot information on that spot. For example, in cases where the existing place information was that acquired from check-in information of the SNS, a name of the user who has posted the check-in information would be displayed as the source of the information. In the example of FIG. 10, it is displayed as "User A". Besides, for example, in cases where the existing place information was that acquired from a phone number, the phone number would be displayed; and in cases where the existing place information was that acquired from a URL, the HTML title of the URL would be displayed. In addition, in a way other than displaying that URL in the detailed spot information display area 186, for example, the URL may be provided as a corresponding hyperlink to the name of the spot shown in the spot name display area 182, the image shown in the image display area 184, or the like.

Figure 11:
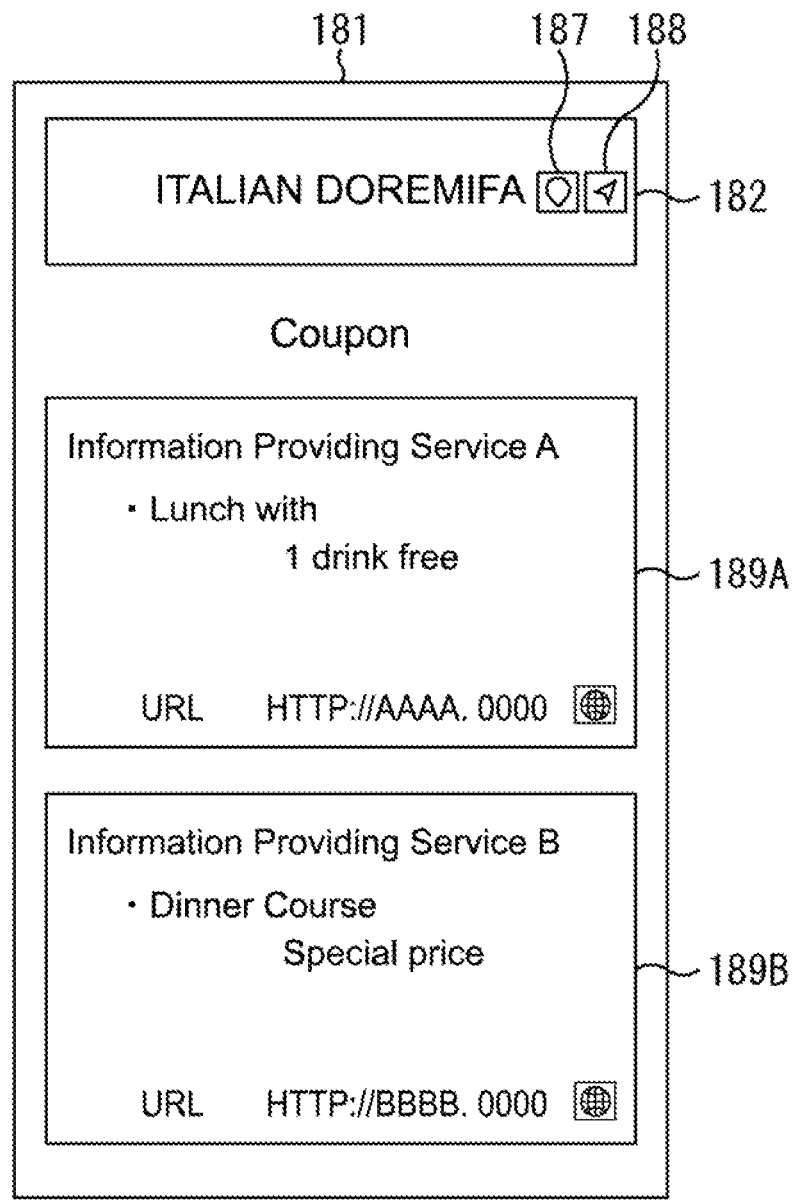
FIG. 11 is a figure showing an example of display of a content of my-spot information detail display screen.

Furthermore, by scrolling the displayed screen of the my-spot information detail display screen 181, as shown in FIG. 11, available coupons which can be used at the spot, some contents including various information related to that spot, and the like may be displayed.

In an example of the my-spot information detail display screen 181 shown in FIG. 11, a contents display area 189A for displaying a content provided from the service provider company of the information provider device 15A; and a contents display area 189B for displaying a content provided from the service provider company of the information provider device 15B, are displayed. In addition, although not shown, a content provided from the service provider company of the information provider device 15C may be displayed by further scrolling the displayed screen of the my-spot information detail display screen 181. Thus, on the touch panel 31, the contents provided from a plurality of service provider companies would be displayed in such a manner that the contents are integrated and arranged within one screen. Incidentally, the contents may also be displayed group by group, corresponding to each service provider company.

In the contents display areas 189A and 189B, for example, the contents of the coupons provided from their respective service provider companies may be displayed. Furthermore, in the contents display area 189A, for example, the spot information that the service provider company of the information provider device 15A has on its own may be displayed, and a URL for accessing a website operated by this service provider company may be displayed. Similarly, in the contents display area 189B, for example, the spot information that the service provider company of the information provider device 15B has on its own may be displayed, and a URL for accessing a website operated by this service provider company may be displayed.

It should be noted that the my-spot information detail display screen 181 may also be displayed by, for example, performing a search. In cases where the my-spot information detail display screen 181 is displayed according to the search, for example, some of the functions such as that of the status switching button 185 would be hidden.

Here, at the my-spot information registration screen 141 of FIG. 6, if the user touches a column of the spot information displayed in the list display area 143 before registering the my-spot information, the my-spot information registration processing part 62 would display a detail screen for a spot before registration, which screen shows detailed information of the spot information displayed in that column, on the touch panel 31.

Figure 12:
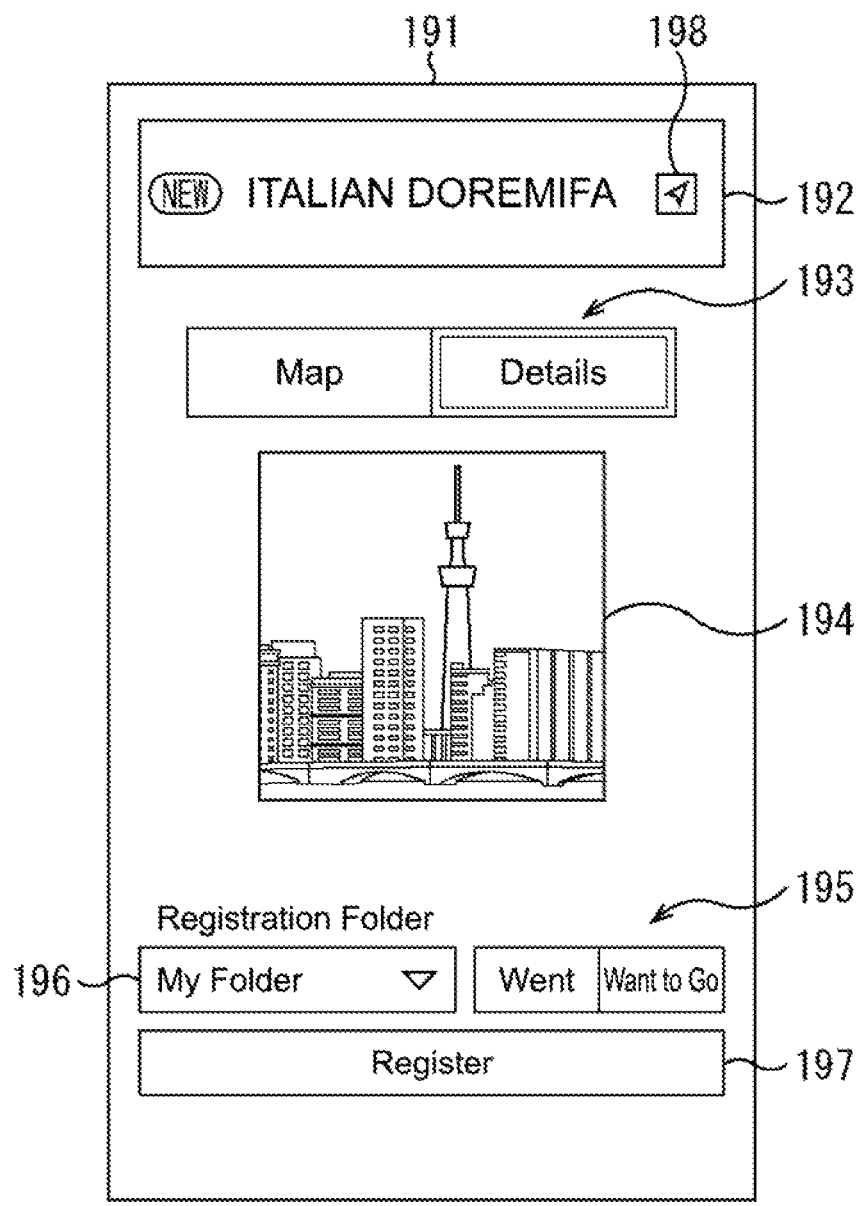
FIG. 12 is a figure showing an example of a detail screen for a spot before registration.

In FIG. 12, a detail screen for a spot before registration that the my-spot information registration processing part 62 displays on the touch panel 31 is shown.

As shown in FIG. 12, in a detail screen 191 for a spot before registration, a spot name display area 192, a display switching button 193, an image display area 194, a dropdown list 196, a status switching button 195 and a register button 197 are displayed.

In the spot name display area 192, a name of the spot that is displayed in the detail screen 191 for a spot before registration is displayed. In an example shown in FIG. 12, a name of the spot "ITALIAN DOREMIFA" is displayed in the spot name display area 182. That is, for example, when the user touches a column of the name of the spot of "ITALIAN DOREMIFA" displayed in the list display area 143 of the my-spot information registration screen 141 of FIG. 6, the detail screen 191 for a spot before registration which shows the detailed information of the spot having the name of "ITALIAN DOREMIFA" would be displayed. Further, in the spot name display area 192, there is also displayed a navigation button 198 which may be operated to perform navigation from the current location to the spot.

The display switching button 193 may be operated to switch the contents to display in the detail screen 191 for a spot before registration. In the example shown in FIG. 12, the display switching button 193 is operable to switch the contents of "Map" and "Details" as the contents to display. FIG. 12 shows a state in which the "Details" is selected as the contents to display. In the image display area 194, an image of the spot included in the spot information is displayed.

The dropdown list 196 may be operated to specify a registration folder to register the spot information being displayed in the detail screen 191 for a spot before registration, as my-spot information. For example, when the dropdown list 196 is operated, a list of registration folders would be displayed, and an arbitrary registration folder can be selected from the listed registration folders. The status switching button 195 may be operated to switch a status with respect to the spot, in the same manner as in the status switching button 185 of FIG. 10. The register button 197 may be operated to perform registration of the spot information being displayed in the detail screen 191 for a spot before registration, as my-spot information.

The user is able to register the my-spot information by using the detail screen 191 for a spot before registration.

As described above, with the my-spot information registration processing part 62, the my-spot information can be registered, and can be displayed. After that, a reminder screen may be displayed by the reminder display processing part 63 when a spot of the my-spot information to which the status indicating "want to go" has been set exists within a predetermined range centered at a current location of the user terminal 13. In addition, for example, the reminder screen may be displayed by the reminder display processing part 63 when the current location of the user terminal 13 is in a predetermined building and the building contains a spot of the my-spot information to which the status indicating "want to go" has been set.

Figure 13:
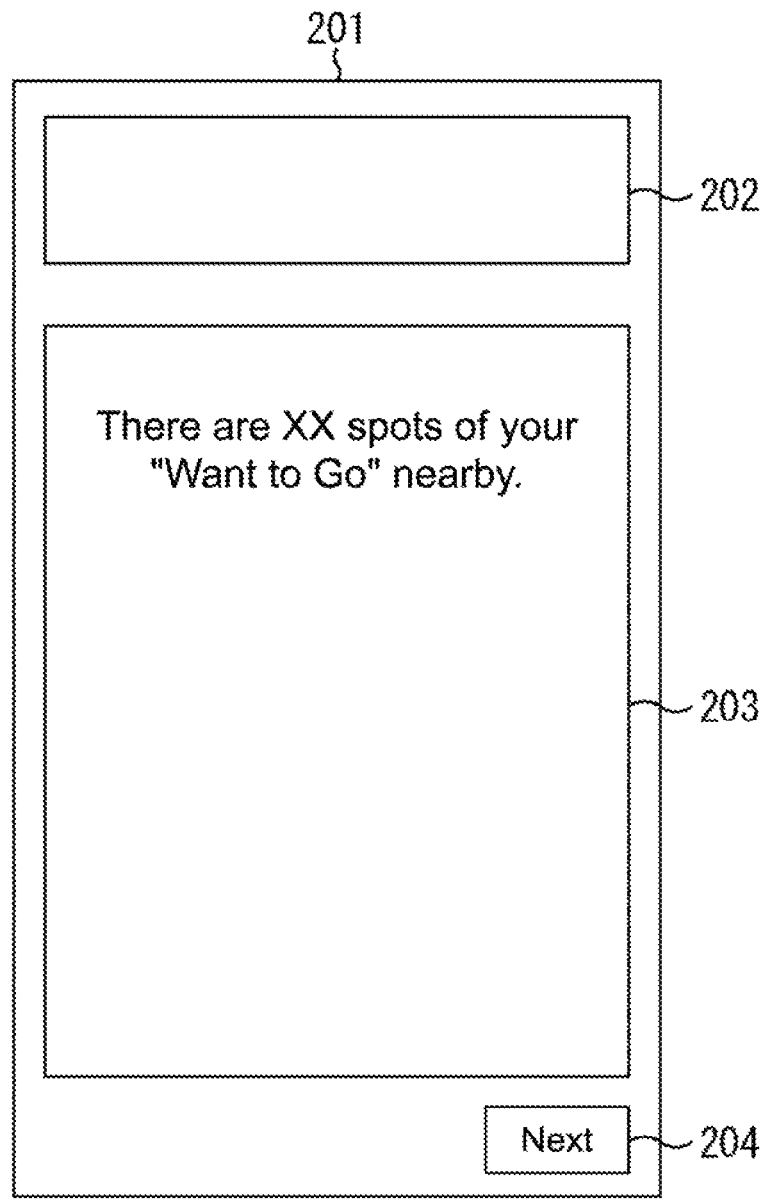
FIG. 13 is a figure showing a reminder screen.

Next, in FIG. 13, a reminder screen that the reminder display processing part 63 displays on the touch panel 31 is shown.

As shown in FIG. 13, in a reminder screen 201, some message display areas 202 and 203, and a button 204 are displayed.

In the message display area 202, a message sent from the administrator of the spot information accumulation server 14 to the user using the service, and the like, may be displayed.

In the message display area 203, a message, which notifies the user that a spot of the my-spot information to which the status indicating "want to go" has been set exists within the predetermined range centered at the current location of the user terminal 13, may be displayed. In an example shown in FIG. 13, a message of "There are XX spots of your "Want to Go"nearby." is displayed in the message display area 203.

The button 204 may be operated when the user who has read the message displayed in the message display area 203 gives an instruction to go to the next process. When the button 204 is operated, a process of suggesting the my-spot information to which the status indicating "want to go" has been set, for the spot existing within the predetermined range centered at the current location of the user terminal 13, would be performed.

For example, in cases where a plurality of pieces of my-spot information to which the status indicating "want to go" has been set exists within the predetermined range centered at the current location of the user terminal 13, a my-spot information list display screen may be displayed.

Figure 14:
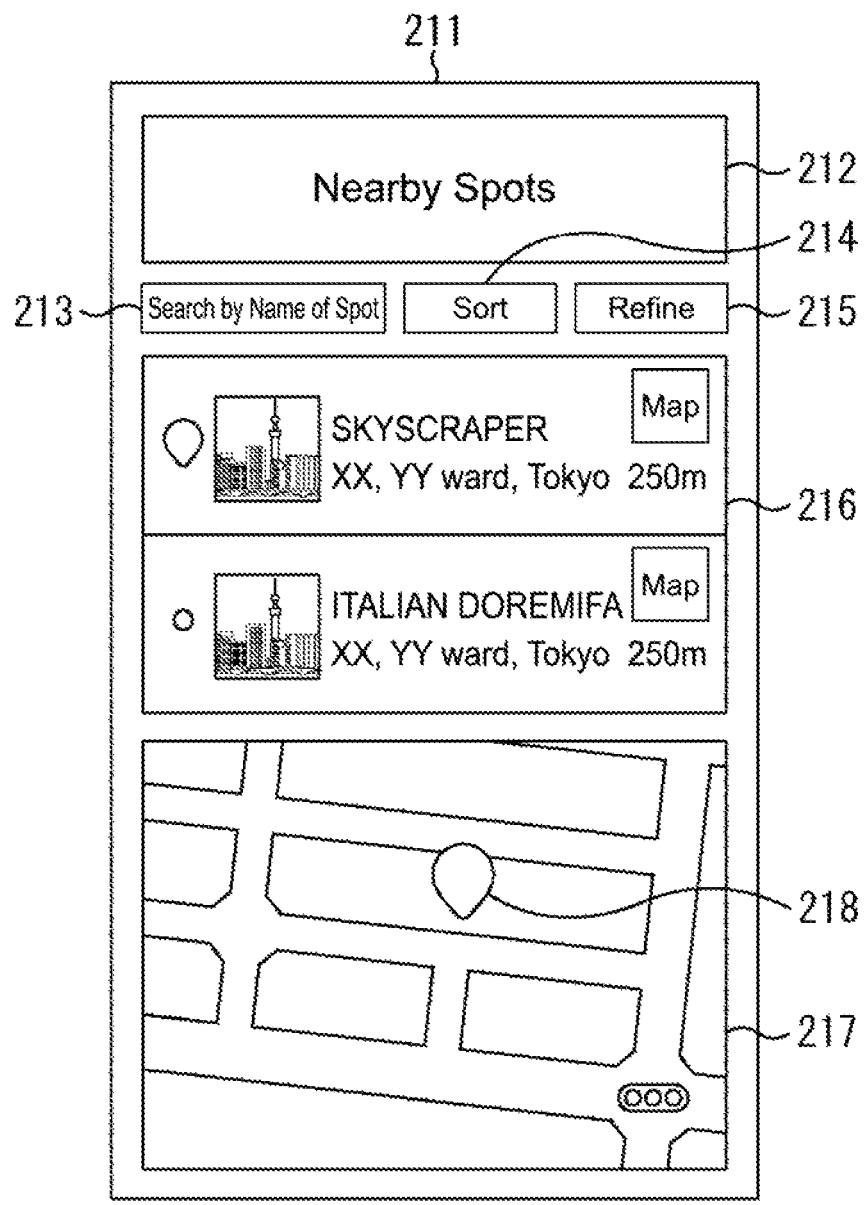
FIG. 14 is a figure showing a my-spot information list display screen.

In FIG. 14, there is shown a my-spot information list display screen that the reminder display processing part 63 displays on the touch panel 31.

As shown in FIG. 14, in a my-spot information list display screen 211, in the same manner as in the my-spot information list display screen 171 of FIG. 9, a screen name display area 212, a spot name search window 213, a sort button 214, a refine button 215, a list display area 216 and a map display area 217 are displayed.

In the list display area 176 that has been described in FIG. 9, the list of the pieces of my-spot information being registered in the registration folder specified as an object of display has been displayed. On the other hand, in the list display area 216 of FIG. 14, only the pieces of my-spot information of the my-spots existing within the predetermined range centered at the current location of the user terminal 13 would be displayed. Then, in the map display area 217, an icon 218 indicating the location of the spot existing nearby would be displayed.

In addition, the reminder display processing part 63 may display the pieces of my-spot information in the list display area 216 in the order from the my-spot closer in distances from the current location to the respective my-spots.

Incidentally, in cases where only one piece of my-spot information to which the status indicating "want to go" has been set exists within the predetermined range centered at the current location of the user terminal 13, the my-spot information detail display screen 181 may be displayed in the same manner as in FIG. 10. Further, also in cases where the user selects one of the pieces of my-spot information displayed in the list display area 216, the my-spot information detail display screen 181 may be displayed. In such cases, some valuable information such as a coupon may be displayed together. In addition, it is also possible to display some valuable information such as coupons for other spots in the neighborhood of the selected spot. It is also possible to display information that a spot being registered as my-spot information has transmitted the valuable information such as a coupon, at a timing of its transmission.

Figure 15:
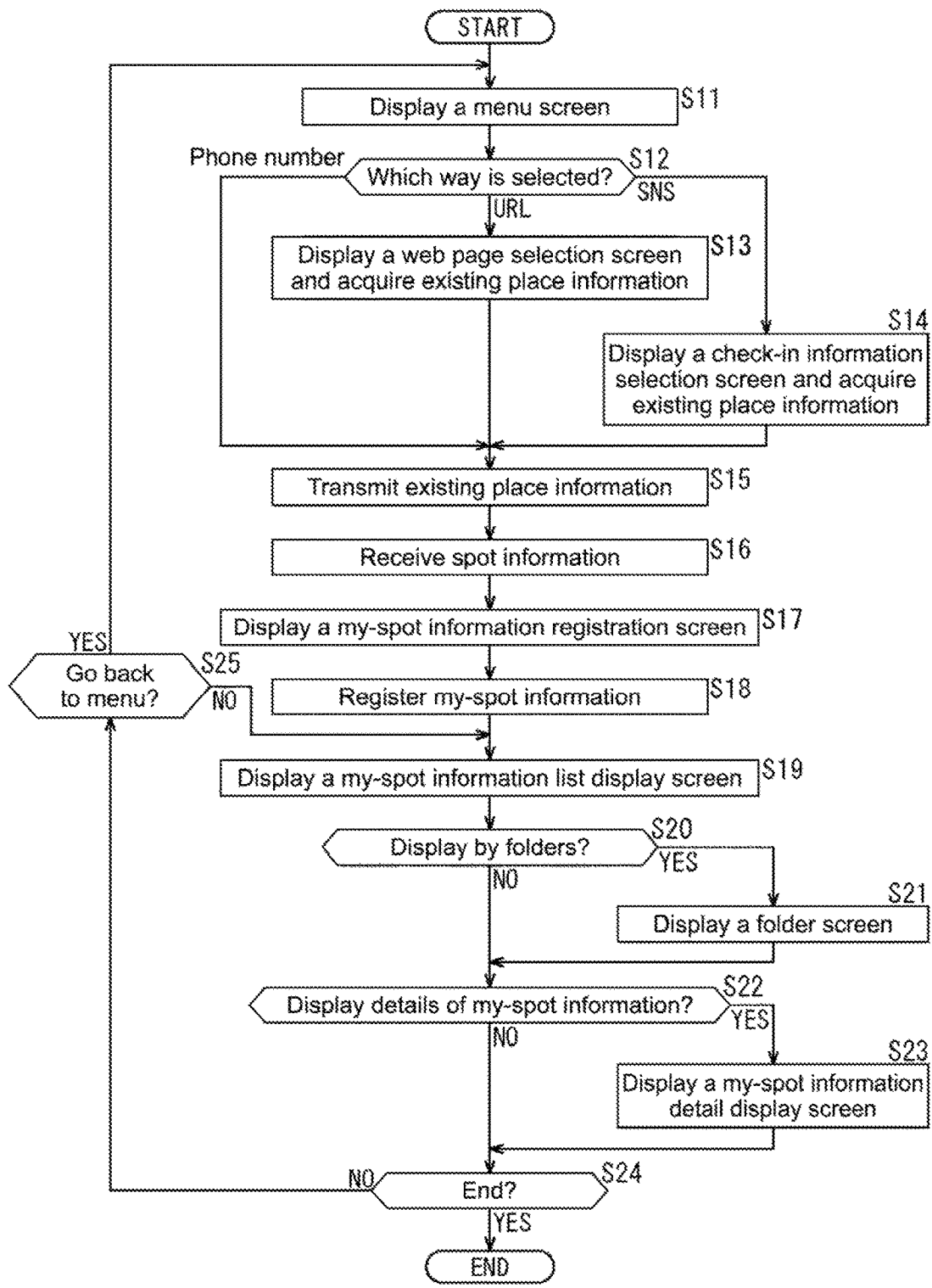
FIG. 15 is a figure showing a flowchart to explain a process of registering my-spot information.

Next, FIG. 15 is a flowchart to explain a process that the existing place information acquisition processing part 61 and the my-spot information registration processing part 62 of the spot information processing part 37 may execute.

For example, when the user operates the user terminal 13 and gives an instruction to start a process by the spot information processing part 37, the process starts. In step S11, the main menu screen 101 (see FIG. 3) is displayed on the touch panel 31.

After the process of step S11, the process goes to step S12. In the step S12, the existing place information acquisition processing part 61 determines which way of acquisition of the existing place information is selected, among the ways using URL; using SNS; and using phone numbers.

For example, in cases where the user touches the URL synchronization start button 108 of the main menu screen 101, the existing place information acquisition processing part 61 determines in the step S12 that the way using URL is selected as the way of acquisition of the existing place; and the process goes to step S13.

In the step S13, the existing place information acquisition processing part 61 displays the web page selection screen 121 (see FIG. 4) on the touch panel 31. Subsequently, when the user selects a website displayed in the list display area 125 and touches the select button 126 to decide the selection of the website, the existing place information acquisition processing part 61 would acquire the existing place information from the website that has been selected by the user. Then, the process goes to step S15.

On the other hand, for example, in cases where the user touches the SNS synchronization start button 109 of the main menu screen 101, the existing place information acquisition processing part 61 determines in the step S12 that the way using SNS is selected as the way of acquisition of the existing place; and the process goes to step S14.

In the step S14, the existing place information acquisition processing part 61 displays the check-in information selection screen 131 (see FIG. 5) on the touch panel 31. Subsequently, when the user selects the check-in information displayed in the list display area 133 and touches the select button 134 to decide the selection of the check-in information, the existing place information acquisition processing part 61 would acquire the existing place information from the check-in information that has been selected by the user. Then, the process goes to the step S15.

Otherwise, for example, in cases where the user touches the phone number synchronization start button 107 of the main menu screen 101, the existing place information acquisition processing part 61 determines in the step S12 that the way using phone numbers is selected as the way of acquisition of the existing place. In this case, the existing place information acquisition processing part 61 would read out all the phone numbers from the phonebook list, the dialed call history list and the received call history list, which lists are stored in the storage part 34, and acquire the phone numbers as the existing place information. Then, the process goes to the step S15.

In the step S15, the existing place information acquisition processing part 61 transmits the acquired existing place information to the spot information accumulation server 14 of FIG. 1 via the communication part 35, and the process goes to step S16.

In the step S16, the my-spot information registration processing part 62 receives the spot information transmitted from the spot information accumulation server 14, which spot information is obtained as a result of the search being performed based on the existing place information that has been transmitted by the step S15.

In step S17, the my-spot information registration processing part 62 displays the my-spot information registration screen 141 (see FIG. 6) on the touch panel 31. A list of the spot information acquired in the step 16 would be displayed in the list display area 143 of the my-spot information registration screen 141. When the user selects the spot information displayed in the list display area 143 and touches the register button 144 to give an instruction to register the selected spot information, the process goes to step S18.

In the step S18, the my-spot information registration processing part 62 performs a process of registering the spot information selected by the user, to register the spot information as my-spot information.

In step S19, the my-spot information registration processing part 62 displays the my-spot information list display screen 151 (see FIG. 7) showing the my-spot information that has been registered by the step S18, on the touch panel 31.

In step S20, the my-spot information registration processing part 62 determines whether or not to display information by folders so that the registration folders are displayed in a list. For example, when the user touches the folder list button 154 in the my-spot information list display screen 151, the my-spot information registration processing part 62 determines to display the information by folders; and the process goes to step S21.

In the step S21, the my-spot information registration processing part 62 displays the information by folders so that the registration folders are displayed in a list. That is, it displays the main menu screen 161 of the registration folders list display of FIG. 8 and enables selection of the registration folder to display. Then, following the selection made by the user, the my-spot information list display screen 171 showing the my-spot information of the corresponding registration folder (see FIG. 9) would be displayed on the touch panel 31. After the process of the step S21, or, in cases where the my-spot information registration processing part 62 is determined not to display the information by folders in the step S20, the process goes to step S22.

In the step S22, the my-spot information registration processing part 62 determines whether or not to display details of the my-spot information. For example, when the user touches an item showing the my-spot information displayed in the list display area 176 of the my-spot information list display screen 171, the my-spot information registration processing part 62 determines to display details of the my-spot information of the touched item; and the process goes to step S23.

In the step S23, the my-spot information registration processing part 62 displays the my-spot information detail display screen 181 (see FIG. 10) with respect to the my-spot information of the item that the user has touched, on the touch panel 31. After the process of the step S23, or, in cases where the my-spot information registration processing part 62 is determined not to display details of the my-spot information in the step S22, the process goes to step S24.

In the step S24, the my-spot information registration processing part 62 determines whether or not to end the process by the spot information processing part 37. For example, when the user performs an operation to end the process by the spot information processing part 37, the my-spot information registration processing part 62 determines to end the process by the spot information processing part 37, hides the screen that it has been displaying on the screen 31, and ends the process.

On the other hand, in cases where the my-spot information registration processing part 62 determines not to end the process by the spot information processing part 37 in the step S24, the process goes to step S25.

In the step S25, the my-spot information registration processing part 62 determines whether or not to go back to the main menu screen 101, following the user's operation. In the step S25, if the my-spot information registration processing part 62 determines not to go back to the main menu screen 101, the process goes back to the step S19; and the subsequent processes would be performed in the same manner. Otherwise, in the step S25, if the my-spot information registration processing part 62 determines to go back to the main menu screen 101, the process goes back to the step S11; and the subsequent processes would be performed in the same manner.

Incidentally, the main menu screen 101 displayed in the step S11 (spot registration display) and the main menu screen 161 displayed in the step S21 (folder list display) are parallel, and the user can select which screen to display. That is, it is also possible to start the process by displaying the main menu screen 161 first.

Figure 16:
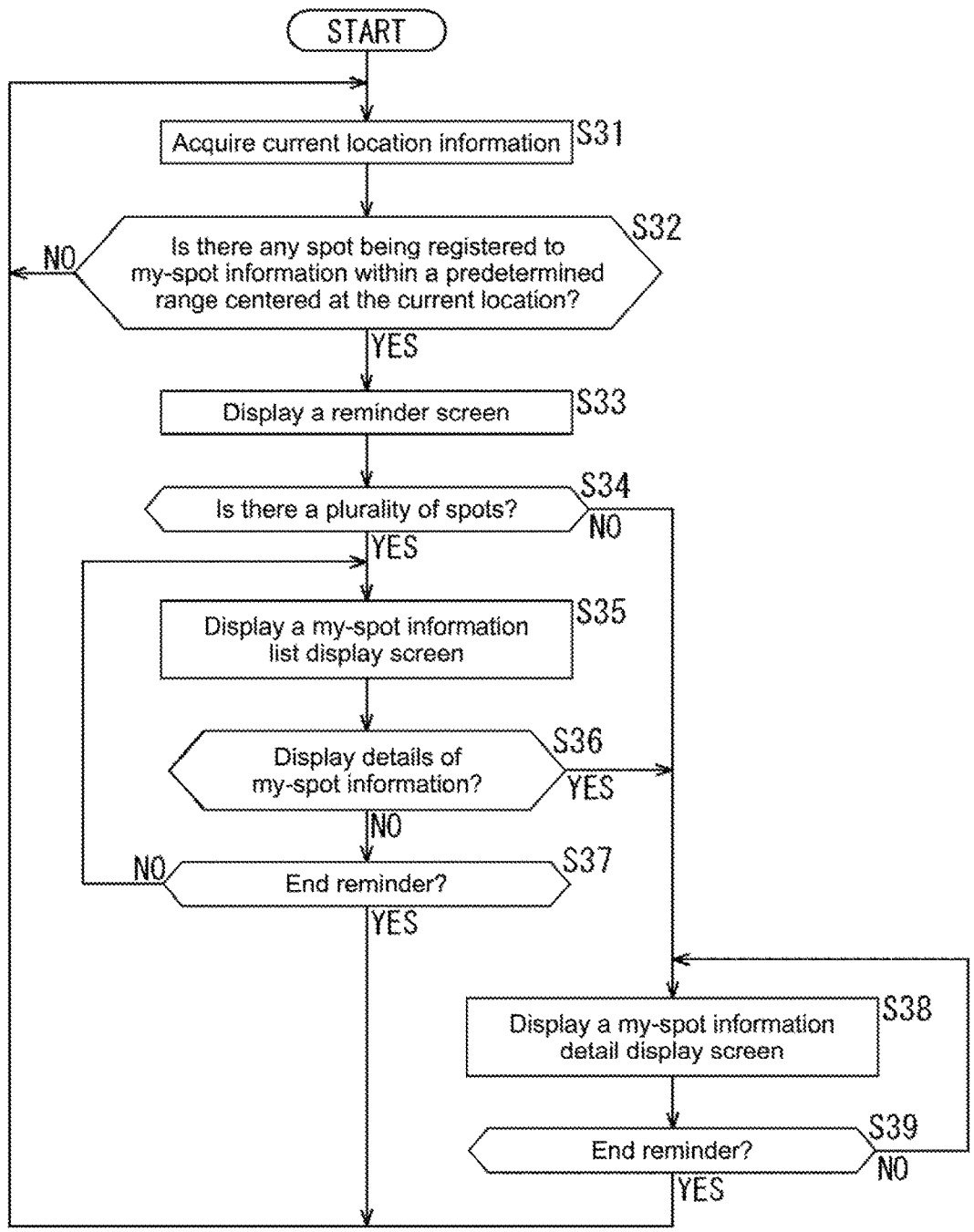
FIG. 16 is a figure showing a flowchart to explain a reminder processing.

Next, FIG. 16 is a flowchart to explain a process that the reminder display processing part 63 of the spot information processing part 37 may execute.

The reminder display processing part 63 executes a reminder processing at all the time when any process by the spot information processing part 37 is performed. In step S31, the reminder display processing part 63 acquires the current location information output from the location information detection part 32.

In step S32, the reminder display processing part 63 looks at the my-spot information that has been registered by the my-spot information registration processing part 62, to determine whether or not any spot of the my-spot information to which the status indicating "want to go" has been set exists within a predetermined range centered at the current location of the user terminal 13. In the step S32, if it is determined that there are no spots of the my-spot information to which the status indicating "want to go" has been set, within the predetermined range centered at the current location of the user terminal 13, the process goes back to the step S31; and the subsequent processes would be performed in the same manner.

On the other hand, in the step S32, if the reminder display processing part 63 determines that there is a spot of the my-spot information to which the status indicating "want to go" has been set, within the predetermined range centered at the current location of the user terminal 13, the process goes to step S33. In the step S33, the reminder display processing part 63 displays the reminder screen 201 (see FIG. 13), on the touch panel 31. Then, when the user touches the button 204 in the reminder screen 201, the process goes to step S34.

In the step S34, the reminder display processing part 63 determines whether or not there is a plurality of spots of the my-spot information to which the status indicating "want to go" has been set, within the predetermined range centered at the current location of the user terminal 13.

In the step S34, if it is determined that there is a plurality of such spots, the process goes to step S35 and the reminder display processing part 63 displays the my-spot information list display screen 211 (see FIG. 14), on the touch panel 31.

In step S36, the reminder display processing part 63 determines whether or not to display details of the my-spot information. For example, when the user touches an item showing the my-spot information displayed in the list display area 216 of the my-spot information list display screen 211, the reminder display processing part 63 determines to display details of the my-spot information of the touched item.

In the step S36, if the reminder display processing part 63 determines not to display details of the my-spot information, the process goes to step S37. The reminder display processing part 63 determines whether or not to end the reminder for the spot of the my-spot information to which the status indicating "want to go" has been set, with respect to the spot within the predetermined range centered at the current location of the user terminal 13. In the step S37, if the reminder display processing part 63 determines not to end the reminder, the process goes back to the step S35; and the subsequent processes would be performed in the same manner.

On the other hand, in the step S36, if the reminder display processing part 63 determines to display details of the my-spot information, the process goes to step S38; and the reminder display processing part 63 displays the my-spot information detail display screen 181 (see FIG. 10) with respect to the my-spot information of the item that the user has touched, on the touch panel 31. Besides, in the step S34, if it is determined that there is not a plurality of such spots (i.e., there is one spot), the process goes to the step S38; and the reminder display processing part 63 displays the my-spot information detail display screen 181 (see FIG. 10) with respect to this spot, on the touch panel 31.

In step S39, the reminder display processing part 63 determines whether or not to end the reminder for the spot of the my-spot information to which the status indicating "want to go" has been set, with respect to the spot within the predetermined range centered at the current location of the user terminal 13. In the step S39, if the reminder display processing part 63 determines not to end the reminder, the process goes back to the step S38; and the subsequent processes would be performed in the same manner.

Then, in the step S37 or the step S39, if the reminder display processing part 63 determines to end the reminder, the process goes back to step S31; and the subsequent processes would be performed in the same manner.

Incidentally, the reminder display processing part 63 may also be configured so as not to provide a reminder regarding the same spot as one that has been displayed by a reminder within a given period of time (e.g., within 24 hours).

In addition, the reminder display processing part 63 may refine the my-spot information displayed in the my-spot information list display screen 211 by predetermined conditions (e.g., prefecture, distance from the current location, genre, presence or absence of a photograph, registered date, updated date, and the source of the information (URL, phone number, SNS, keyword or map)). Further, the reminder display processing part 63 may rearrange the order of the pieces of my-spot information displayed in the my-spot information list display screen 211 by predetermined conditions (e.g., name, prefecture, distance from the current location, registered date, or updated date). It should be noted that such a process may also be performed by the my-spot information registration processing part 62.

Furthermore, for example, the reminder display processing part 63 may filter the my-spot information by the registered date or updated date of the my-spot information, and allow only the spot information that has been registered or updated within a given period of time to the current time to be displayed. It should be noted that such a process may also be performed by the my-spot information registration processing part 62.

Besides, the spot information processing part 37 may acquire the spot information on the basis of an image taken by the imaging part 33 of FIG. 1. For example, in cases where the current location information output from the location information detection part 32 is added to the image data that is allowed by the imaging part 33 to be stored in the storage part 34, the existing place information acquisition processing part 61 may acquire the current location information as the existing place information and transmit it to the spot information accumulation server 14. Further, the existing place information acquisition processing part 61 may also recognize the characters contained in the image taken by the imaging part 33, by performing character recognition processing, to acquire the existing place information. Thus, it is possible to acquire the spot information on the basis of the image taken by the imaging part 33.

Furthermore, the spot information processing part 37 may acquire the spot information on the basis of map information. For example, the external service linking function processing part 53 may allow a map to be displayed on the touch panel 31, and the user can touch a certain point of the map. This may allow the existing place information acquisition processing part 61 to acquire the location information (latitude and longitude) of the specified point as the existing place information, and acquire the spot information on the basis of that existing place information.

Incidentally, in the above description, the spot information is acquired in response to the user's operation, and the acquired spot information is suggested in response to the user's operation. However, for example, the spot information processing part 37 may also acquire the spot information periodically at a given timing and notify the user that the spot information is acquired.

The existing place information acquisition processing part 61 may be configured to, for example, perform the process of acquiring the existing place information at a timing of once a day. Then, when the timing to perform the process comes, the existing place information acquisition processing part 61 may acquire the existing place information on the basis of various lists (the browsing history list, the bookmark list, the phonebook list, the dialed call history list, the received call history list or the check-in information list) that have been stored in the storage part 34. At this time, in cases where it is the first time to acquire this existing place information, the existing place information acquisition processing part 61 may perform the process of acquiring the existing place information with respect to the entire information registered in the lists. Otherwise, in cases where it is the second or later time the existing place information acquisition processing part 61 acquires the existing place information, it may perform the process of acquiring the existing place information with respect to the difference from the previous one.

Then, in cases where the my-spot information processing part 62 has acquired the existing place information from any of the browsing history list, the bookmark list, the phonebook list, the dialed call history list, the received call history list and the check-in information list; when the my-spot information processing part 62 receives the spot information transmitted as a result of the search from the spot information accumulation server 14, it may display a message showing that it has received the spot information (e.g., the mark of "NEW" as shown in FIG. 3, etc.) on the touch panel 31, at the timing of receiving the spot information. In addition, when the my-spot information processing part 62 receives the spot information transmitted as the result of the search from the spot information accumulation server 14, it displays the my-spot information registration screen 141 (see FIG. 6), which shows the received spot information, on the touch panel 31. Further, when the my-spot information processing part 62 receives the spot information transmitted from the spot information accumulation server 14 as a result of the search based on the existing place information that has been acquired from the check-in information list, it displays the check-in information selection screen 131 (see FIG. 5) on the touch panel 31.

It should be noted that the present disclosure may be applied to the user terminal 13 such as a so-called smartphone, and in addition to that, for example, it can also be applied to apparatuses or devices which are capable of performing communications via the network 12. Specifically, the present disclosure may also be applied to a personal computer, a tablet type computer, a PDA (Personal Digital Assistant), a wearable device (e.g., a wearable display device such as an eyeglasses-type device and a wristwatch-type device), an electronic book terminal, a television receiver and the like. That is, such apparatuses or devices may be configured to execute the processes executed by the user terminal 13 described above.

In addition, for example, the existing place information acquisition processing part 61 may acquire, as the existing place information, a URL or a phone number contained in an E-mail that the user terminal has received or transmitted; and then the my-spot information processing part 62 may automatically register them as the my-spot information.

Further, in cases where the user terminal 13 is capable of receiving television broadcasts, the existing place information acquisition processing part 61 may also acquire the existing place information related to a spot introduced in a program, from voices of the program being viewed or listened to, characters inserted in the program, detailed information of the program, an EPG (Electronic Program Guide) data and the like; and then the my-spot information processing part 62 may automatically register it as the my-spot information. Still further, the present disclosure may be applied to a recorder for recording the program. In this case, the existing place information related to the spot introduced in the program may be acquired from the program recorded in the recorder; and may be automatically registered as the my-spot information. Still further, in cases where the user terminal 13 is capable of remote-controlling a television receiver, the existing place information related to the spot introduced in the program may be acquired from the program being viewed or listened to via the television receiver, based on its viewing history; and may be automatically registered as the my-spot information.

Incidentally, in cases where the user terminal 13 is provided with an electronic book viewer function, the existing place information related to a spot introduced in a book (magazines, books, etc.), which has been viewed with the user terminal 13, may be acquired; and may be automatically registered as the my-spot information.

In addition, at the time when the browser function processing part 51 displays a web page, the browser function processing part 51 may display a button for registering my-spot information; acquire the existing place information contained in the displayed web page when the button is operated; and allow the my-spot information to be registered automatically. Further, it is also possible to acquire the existing place information based on location information of a location at which a check in is made by the user, when the user makes the check in to a given SNS with the use of the user terminal 13; and then allow the my-spot information to be registered automatically. Still further, in a service for posting simple messages, a service for exchanging messages between users, or the like, it is also possible to acquire, as the existing place information, a URL or a phone number contained in a message posted by or exchanged with a specific other user; and the my-spot information processing part 62 may automatically register such information as the my-spot information. Still further, by associating the spot information to an image (a stamp) which can be added to the messages, it may allow the users to exchange the spot information by using the image.

Furthermore, it is also possible to transfer the information registered as the my-spot information, to other apparatuses or devices such as a car navigation; and the information may be used in the apparatus or device of the transfer destination. Besides, it is possible to allow the spot registered as the my-spot information to be displayed in AR (Augmented Reality) when a map is to be displayed in the map display area 177 as shown in FIG. 9. In addition, when a navigation is to be performed to the spot as a destination, the spot as the destination may be displayed in AR; and some information of the surrounding area of the destination, sales information, available time information or the like may be displayed therewith in an overlapping manner.

The my-spot information processing part 62 may perform, on the basis of location information, for example, an automatic switching of statuses which can change the status of "want to go" into "went" at the time of reaching the spot to which the status indicating "want to go" has been set by the corresponding status switching button 147. Alternatively, the my-spot information processing part 62 may perform behavior recognition based on a staying time at that spot, a moving speed, and the like, and may automatically change the status to "went". In addition, the my-spot information processing part 62 may automatically classify, by arrival date, the spots to which the status indicating "went" is set.

Further, a status indicating "going now" may be provided; and if such a status is provided, the my-spot information processing part 62 may set a status of a spot to "going now" during a navigation to that spot. In cases where the statuses of a plurality of spots are set to "going now", it is also possible to display an optimal route to go to the plurality of spots.

Still further, the my-spot information that has been registered in the user terminal 13 may be shared with other users. For example, it is possible to create a ranking of the given spots by the statuses of "went" or "want to go" according to pieces of my-spot information from a plurality of users, and recommend the user this ranking as the recommended spots. Furthermore, it is possible to select the recommended spots out of the pieces of my-spot information from the plurality of users, on the basis of areas and genres, and recommend them to the user. Moreover, by accumulating the pieces of my-spot information from the plurality of users, it is also possible to use or sell, as marketing data, the information regarding spots to which the status of "went" or "want to go" is set.

In addition, the user terminal 13 may allow advertisement, coupon, or the like for the spot registered as the my-spot information, or advertisement, coupon, or the like for the spots nearby this spot, to be displayed in any of the screens described above (e.g., the message display area 202 in FIG. 13). Alternatively, the user terminal 13 may allow advertisement, coupon, or the like for some related spots based on the area and the genre of the spot registered as the my-spot information to be displayed in the screens.

Incidentally, for example, when the my-spot information is registered on the basis of the existing place information acquired from the check-in information by the external service linking function processing part 53, the telephone function processing part 52 may register the phone number of this spot in the phonebook list; and the browser function processing part 51 may register the URL of this spot in the bookmark list.

Further, for example, it is also possible that a service provider company providing the service by the information accumulation server 14 may provide a my-spot information registration button in the websites operated by the service provider companies of the information provider devices 15A to 15C; which my-spot information registration button is provided for registering my-spot information. This allows the user to register the my-spot information by simply browsing the websites operated by the service provider companies of the information provider devices 15A to 15C and touching the my-spot information registration buttons. In addition, in the websites operated by the service provider companies of the information provider devices 15A to 15C, it is also possible to allow the information of a certain spot to be registered as the my-spot information when a certain other user specified by the user registers the information of this spot.

Besides, it is also possible that when the user terminal 13 executes an application for displaying a map and registers a given spot in the application, the my-spot information processing part 62 automatically registers the spot information of the spot as the my-spot information.

It should be noted that the processes that have been described above, referring to the flowcharts, are not necessarily processed in a time series manner along the order described by the flowcharts. The processes may also include some processes which are executed in parallel or executed individually (e.g., parallel processing or object processing). In addition, the program may be one which is processed by a single computer, or may be one which is processed by a plurality of computers in a distributed manner. As used herein, the term "system" represents an entire apparatus which is composed of a plurality of apparatuses or devices.

Further, the series of processes described above may be executed either by hardware or by software. When the series of processes is to be executed by the software, a program composing the software may be installed from a recording medium with the program recorded, in a computer incorporated in dedicated hardware; or, for example, in a general-purpose personal computer which can execute various kinds of functions by installing therein various kinds of programs.

Figure 17:
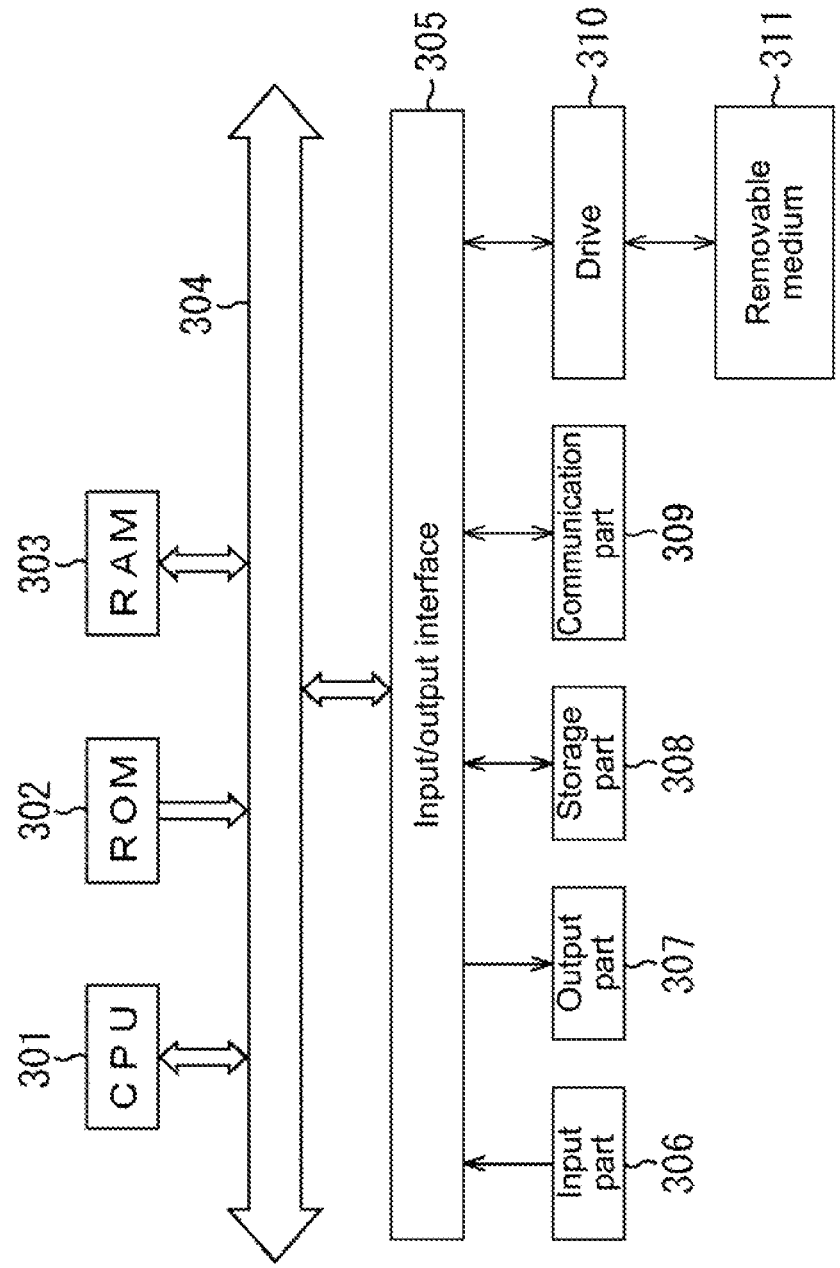
FIG. 17 is a block diagram showing a configuration example of an embodiment of a computer according to the present disclosure.

FIG. 17 is a block diagram showing a configuration of hardware of a computer for executing the series of processes described above in accordance with a program.

In the computer, a CPU (Central Processing Unit) 301, a ROM (Read Only Memory) 302, and a RAM (Random Access Memory) 303 are connected to one another through a bus 304.

An input/output interface 305 is also connected to the bus 304. An input part 306 which may include a keyboard, a mouse, a microphone, and the like; an output part 307 which may include a display, a speaker, and the like; a storage part 308 which may include a hard disk, a non-volatile memory, and the like; a communication part 309 which may include a network interface and the like; and a drive 310 that drives a removable medium 311 such as a magnetic disk, an optical disk, a magneto optical disk and a semiconductor memory; are connected to the input/output interface 305.

In the computer configured in the manner as described above, for example, the CPU 301 loads the program stored in the storage part 308 into the RAM 303 through the input/output interface 305 and the bus 304 in order to execute the program, thereby executing the series of processes described above.

The program which the computer (the CPU 301) executes may be provided by, for example, being recorded on the removable medium 311 which is a package medium such as a magnetic disk (including a flexible disk) an optical disk (CD-ROM (Compact Disc-Read Only Memory), DVD (Digital Versatile Disc), etc.), a magneto optical disk and a semiconductor memory; or may be provided through wired or wireless transmission media such as a Local Area Network, the Internet, and digital satellite broadcasting.

The program may be installed in the storage part 308 through the input/output interface 305, by mounting the removable medium 311 to the drive 310. In addition, the program may be received at the communication part 309 through the wired or wireless transmission media to be installed in the storage part 308. Further, the program may have been previously installed in the ROM 302 or in the storage part 308.

The present disclosure may employ the following configurations.

(1) An information processing apparatus including:
an existing place information acquisition part configured to acquire existing place information which specifies an existing place; and
a my-spot information registration part configured to
acquire spot information related to a spot, which spot information is provided from a plurality of information provider devices, based on the existing place information and
register spot information specified by a user as my-spot information, out of the acquired spot information.

(2) The information processing apparatus according to (1), further including
a reminder processing part configured to suggest the spot information of the spot that exists within a predetermined range with respect to a current location, in response to current location information indicating the current location, to the user.

(3) The information processing apparatus according to (1) or (2), further including
a telephone function processing part configured to perform a process related to voice phone;
the existing place information acquisition part being configured to acquire a phone number that has been registered, dialed or received by the telephone function processing part, as the existing place information.

(4) The information processing apparatus according to any one of (1) to (3), further including
a browser function processing part configured to display a web page;
the existing place information acquisition part being configured to acquire the existing place information from a web page that has been registered by the browser function processing part or from a web page recorded in a history of browsing by the browser function processing part.

(5) The information processing apparatus according to any one of (1) to (4), further including
an external service linking function processing part configured to perform a process in coordination with an external service;
the existing place information acquisition part being configured to acquire check-in information which at least includes location information, posted in the external service and is acquired by the external service linking function processing part, as the existing place information.

(6) The information processing apparatus according to any one of (1) to (5), in which
the existing place information acquisition part is configured to acquire the existing place information periodically at a given timing, and
the my-spot information registration part is configured to notify the user that the spot information is acquired, at the timing when the spot information is acquired based on the existing place information.

(7) The information processing apparatus according to any one of (1) to (6), further including
a display part configured to display the spot information, in which, when the display part displays detailed information of a predetermined spot, the display part integrates the spot information thereof provided from the plurality of information provider devices, and displays by arranging the integrated spot information within one screen.

(8) The information processing apparatus according to (7), in which
the display part displays a list that is an integrated list of the spot information provided from the plurality of information provider devices, acquired by the my-spot information registration part.

(9) An information processing method including:
acquiring existing place information which specifies an existing place; and
acquiring spot information related to a spot, which spot information is provided from a plurality of information provider devices, based on the existing place information, and registering spot information specified by a user as my-spot information, out of the acquired spot information.

(10) A program for causing a computer to execute a process including:
acquiring existing place information which specifies an existing place; and
acquiring spot information related to a spot, which spot information is provided from a plurality of information provider devices, based on the existing place information, and registering spot information specified by a user as my-spot information, out of the acquired spot information.

(11) An information processing system including:
an existing place information acquisition part configured to acquire existing place information which specifies an existing place;
a spot information providing processing part configured to search for spot information related to a spot provided from a plurality of information provider devices, based on the existing place information and provide a result of the search; and
a my-spot information registration part configured to register spot information specified by a user as my-spot information, out of the spot information provided by the spot information providing processing part.

In addition, the present disclosure is not limited to each of the above-mentioned embodiments and can be variously modified without departing from the gist of the present disclosure.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
hardware circuitry configured to:
acquire existing place information which specifies a location of an existing place,
acquire spot information related to a plurality of spots, which spot information is provided for each spot from a plurality of information provider devices connected to a user through a social networking service, based on the location of the existing place information,
display an integrated list of the spot information acquired for the plurality of spots from the plurality of information provider devices, and
register my-spot information specified by the user, out of the displayed integrated list of the plurality of spots of the acquired spot information, wherein the my-spot information indicates a status of the registered spot information selected from a group consisting of each spot of the plurality of spots to which the user has been and each spot of the plurality of spots to which the user wants to go,
wherein, when the status of the registered spot information indicates particular spots of the plurality of spots to which the user wants to go, the circuitry is further configured to display at least one of a number of and a list of the particular spots in response to current location information of the user indicating that the particular spots exist within a predetermined range with respect to a current location of the user.

2. The information processing apparatus according to claim 1, wherein the circuitry is further configured to
perform a process related to voice phone, and
acquire a phone number that has been registered, dialed, or received by the user, as the existing place information.

3. The information processing apparatus according to claim 1, wherein the circuitry is further configured to
display a web page, and
acquire the existing place information from the displayed web page that has been registered or recorded in a history of browsing.

4. The information processing apparatus according to claim 1, wherein the circuitry is further configured to
perform a process in coordination with the social networking service, and
acquire check-in information which at least includes location information, posted in the social networking service, and is acquired by the social networking service, as the existing place information.

5. The information processing apparatus according to claim 1, wherein the circuitry
acquires the existing place information periodically at a given timing, and
displays the integrated list of the spot information which is acquired from the plurality of information provider devices, at the timing when the spot information is acquired based on the existing place information.

6. The information processing apparatus according to claim 1, wherein the circuitry displays the integrated list of the spot information by arranging the integrated list of the spot information within one screen.

7. The information processing apparatus according to claim 6, wherein the circuitry displays the list of the particular spots as an integrated list of the spot information provided from the plurality of information provider devices.

8. The information processing apparatus according to claim 1, wherein the circuitry displays the integrated list of the spot information with based on integration of different contents obtained from the plurality of information provider devices.

9. An information processing method, implemented via at least one processor, the method comprising:
acquiring existing place information which specifies a location of an existing place;
acquiring spot information related to a plurality of spots, which spot information is provided for each spot from a plurality of information provider devices connected to a user through a social networking service, based on the location of the existing place information;
displaying an integrated list of the spot information acquired for the plurality of spots from the plurality of information provider devices; and
registering my-spot information specified by the user, out of the displayed integrated list of the plurality of spots of the acquired spot information, wherein the my-spot information indicates a status of the registered spot information selected from a group consisting of each spot of the plurality of spots to which the user has been and each spot of the plurality of spots to which the user wants to go,
wherein, when the status of the registered spot information indicates particular spots of the plurality of spots to which the user wants to go, the at least one processor displays at least one of a number of and a list of the particular spots in response to current location information of the user indicating that the particular spots exist within a predetermined range with respect to a current location of the user.

10. A non-transitory computer-readable medium having embodied thereon a program, which when executed by a computer, causes the computer to execute a process, the process comprising:
acquiring existing place information which specifies an existing place;
acquiring spot information related to a spot, which spot information is provided from a plurality of information provider devices connected to a user through a social networking service, based on the existing place information;
displaying an integrated list of the spot information acquired for the plurality of spots from the plurality of information provider devices; and
registering my-spot information specified by the user, out of the displayed integrated list of the acquired spot information, wherein the my-spot information indicates a status of the registered spot information selected from a group consisting of each spot of the plurality of spots to which the user has been and each spot of the plurality of spots to which the user wants to go,
wherein, when the status of the registered spot information indicates particular spots of the plurality of spots to which the user wants to go, the computer is further configured to display at least one of a number of and a list of the particular spots in response to current location information of the user indicating that the particular spots exist within a predetermined range with respect to a current location of the user.

11. An information processing system comprising:
a memory configured to store a program; and
at least one processor connected to the memory and configured to execute the stored program,
wherein an existing place information acquisition part is configured to acquire existing place information which specifies a location of an existing place,
wherein a spot information providing processing part is configured to
search for spot information related to a plurality of spots provided from a plurality of information provider devices connected to a user through a social networking service, based on the location of the existing place information, and
provide a result of the search as an integrated list of the spot information acquired for the plurality of spots from the plurality of information provider devices,
wherein a my-spot information registration part is configured to register my-spot information specified by the user, out of the provided integrated list of the plurality of spots of the spot information provided by the spot information providing processing part, wherein the my-spot information indicates a status of the registered spot information selected from a group consisting of each spot of the plurality of spots to which the user has been and each spot of the plurality of spots to which the user wants to go,
wherein, when the status of the registered spot information indicates particular spots of the plurality of spots to which the user wants to go, the spot information providing processing part is further configured to provide at least one of a number of and a list of the particular spots in response to current location information of the user indicating that the particular spots exist within a predetermined range with respect to a current location of the user, and
wherein the existing place information acquisition part, the spot information providing processing part, and the my-spot information registration part are each implemented via the at least one processor.

\* \* \* \* \*